(12) United States Patent
Yoneyama

(10) Patent No.: US 9,784,954 B2
(45) Date of Patent: Oct. 10, 2017

(54) REAR CONVERSION LENSES

(71) Applicant: Samsung Electronics Co., Ltd., Gyeonggi-do (KR)

(72) Inventor: Shuji Yoneyama, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/994,471

(22) Filed: Jan. 13, 2016

(65) Prior Publication Data

US 2016/0223799 A1 Aug. 4, 2016

(30) Foreign Application Priority Data

Jan. 30, 2015 (KR) ................. 10-2015-0015587

(51) Int. Cl.
| | | |
|---|---|---|
| *G02B 15/02* | (2006.01) | |
| *G02B 15/10* | (2006.01) | |
| *G02B 9/60* | (2006.01) | |
| *G02B 7/14* | (2006.01) | |
| *G02B 15/173* | (2006.01) | |

(52) U.S. Cl.
CPC ............. *G02B 15/10* (2013.01); *G02B 7/14* (2013.01); *G02B 9/60* (2013.01); *G02B 15/173* (2013.01)

(58) Field of Classification Search
CPC ..................................................... G02B 15/10
USPC .......................................................... 359/675
See application file for complete search history.

(56) References Cited

U.S. PATENT DOCUMENTS

| | | |
|---|---|---|
| 4,154,508 A | 5/1979 | Nakamura |
| 5,253,112 A | 10/1993 | Suzuki et al. |
| 5,349,474 A | 9/1994 | Shimizu et al. |
| 5,627,677 A | 5/1997 | Suzuki |
| 6,813,089 B2 | 11/2004 | Tsutsumi |
| 7,593,163 B2 | 9/2009 | Yamada et al. |
| 8,027,097 B2 | 9/2011 | Eguchi |
| 8,223,436 B2 | 7/2012 | Sugita et al. |
| 8,270,824 B2 | 9/2012 | Nishimura et al. |
| 2012/0050868 A1 | 3/2012 | Takayama |
| 2014/0168500 A1* | 6/2014 | Chen .................... G02B 13/009 348/345 |
| 2015/0205188 A1 | 7/2015 | Ogata |

FOREIGN PATENT DOCUMENTS

| | | |
|---|---|---|
| JP | 5-142473 A | 6/1993 |
| JP | 5-188289 A | 7/1993 |
| JP | 6-175021 A | 6/1994 |
| JP | 7-27975 A | 1/1995 |
| JP | 7-151965 A | 6/1995 |
| JP | 7-174968 A | 7/1995 |
| JP | 8-184755 A | 7/1996 |

(Continued)

*Primary Examiner* — James Jones
(74) *Attorney, Agent, or Firm* — Cha & Reiter, LLC

(57) ABSTRACT

A rear conversion lens, which may include a plurality of lenses may be disposed at a side of master lenses facing an image side for varying a focal length, and may include: a first lens having a positive refractive power; a second lens having a biconcave shape; a third lens having a positive refractive power; a fourth lens having a positive refractive power; and a fifth lens having a negative refractive power. The first to fifth lenses may be sequentially arranged in a direction from an object side to the image side.

16 Claims, 20 Drawing Sheets

(56) References Cited

FOREIGN PATENT DOCUMENTS

| | | |
|---|---|---|
| JP | 2001-33692 A | 2/2001 |
| JP | 2001-33693 A | 2/2001 |
| JP | 2002-267929 A | 9/2002 |
| JP | 2003-302574 A | 10/2003 |
| JP | 2004-226648 A | 8/2004 |
| JP | 2004-226740 A | 8/2004 |
| JP | 2005-43788 A | 2/2005 |
| JP | 2005-107261 A | 4/2005 |
| JP | 2006-349904 A | 12/2006 |
| JP | 2007-93940 A | 4/2007 |
| JP | 2009-80176 A | 4/2009 |
| JP | 2009-186611 A | 8/2009 |
| JP | 2010-15049 A | 1/2010 |
| JP | 2010-122427 A | 6/2010 |
| JP | 2010-191211 A | 9/2010 |
| JP | 2010-271502 A | 12/2010 |
| JP | 2011-2563 A | 1/2011 |
| JP | 2011-17849 A | 1/2011 |
| JP | 2011-81111 A | 4/2011 |
| JP | 2011-112725 A | 6/2011 |
| JP | 2011-123334 A | 6/2011 |
| JP | 2011-123336 A | 6/2011 |
| JP | 2011-175054 A | 9/2011 |
| JP | 2012-47869 A | 3/2012 |
| JP | 2012-48081 A | 3/2012 |
| JP | 2012-247450 A | 12/2012 |
| JP | 2013-235217 A | 11/2013 |
| JP | 2013-250290 A | 12/2013 |
| JP | 2013-250291 A | 12/2013 |
| JP | 2014-115410 A | 6/2014 |

* cited by examiner

REAR CONVERSION LENSES

CLAIM OF PRIORITY

This application claims the benefit of Korean Patent Application No. 10-2015-0015587, filed on Jan. 30, 2015, in the Korean Intellectual Property Office, the disclosure of which is incorporated herein in its entirety by reference.

BACKGROUND

1. Technical Field

The present disclosure relates to rear conversion lens, which may include a plurality of lenses, detachably attached to an image side of a master lens, which may include a plurality of lenses, for varying the focal length of the master lens.

2. Description of the Related Art

Conversion lenses may be attached to an object side or an image side of master lenses of a photographing device, such as, for example, a camera or a video camera, for varying the focal length of the master lenses. Master lenses refer to lenses disposed in a main body of a photographing device, such as, for example, a camera or a video camera. Conversion lenses attached to an object side of master lenses are referred to as front conversion lenses, and conversion lenses attached to an image side of master lenses are referred to as rear conversion lenses.

Front conversion lenses attached to master lenses vary the focal length of the master lenses without varying brightness. However, it is difficult to decrease the overall size and aberrations of a lens system employing front conversion lenses. On the other hand, although rear conversion lenses added to a lens system vary the brightness of the lens system, it is possible to decrease the size of the lens system.

Along with the development and spread of photographing devices such as digital cameras, the use of photographing devices capable of displaying images captured using imaging devices (image sensors) on displays or electronic viewfinders has increased, and the use of photographing devices not including optical viewfinders has also increased. For example, interchangeable lens cameras have been used, and employ so called single-lens reflex finders in which light is reflected to a finder optical system by a mirror disposed at an angle of about 45 degrees with respect to an image side of photographing lenses for compatibility with various lenses. However, recent digital cameras not employing optical viewfinders are provided in the form of mirrorless cameras. Since mirrors are not used in such photographing devices, the distance between a lens mount surface and an image surface may be smaller in such photographing devices than in single-lens reflex cameras as compared to those with mirrors.

SUMMARY

Disclosed are rear conversion lenses disposed at a rear side of master lenses of an interchangeable lens camera having a relatively short flange back for varying the focal length of the master lenses.

Additional aspects will be set forth in part in the description which follows and, in part, will be apparent from the description, or may be learned by practice of the presented embodiments.

According to an aspect of an embodiment, rear conversion lenses may be disposed at a side of master lenses facing an image side for varying a focal length. The rear conversion lenses may include: a first lens having a meniscus shape convex toward the image side and a positive refractive power; a second lens having a biconcave shape; a third lens having a positive refractive power. The absolute value of curvature of an object-side surface of the third lens may be greater than the absolute value of curvature of an image-side surface of the third lens. The rear conversion lenses may also include a fourth lens having a positive refractive power and a biconvex shape, and a fifth lens having a negative refractive power. The first, second, third, fourth, and fifth lenses may be sequentially arranged in a direction from an object side to the image side.

The rear conversion lenses may satisfy the following Expression:

$$N1>1.85 \qquad \text{<Expression>}$$

where N1 denotes a refractive index of the first lens at a d-line.

The rear conversion lenses may satisfy the following Expression:

$$N2>1.85$$

where N2 denotes a refractive index of the second lens at a d-line.

The rear conversion lenses may satisfy the following Expression:

$$N5>1.85 \qquad \text{<Expression>}$$

where N5 denotes a refractive index of the fifth lens at a d-line.

The rear conversion lenses may satisfy the following Expression:

$$N4<1.65 \qquad \text{<Expression>}$$

where N4 denotes a refractive index of the fourth lens at a d-line.

The rear conversion lenses may satisfy the following Expression:

$$0.8<fbRC/Y<1.2 \qquad \text{<Expression>}$$

where fbRC denotes a back focal length of the rear conversion lenses at a predetermined magnification, and Y denotes a maximum image height.

The rear conversion lenses may be divided into a first lens group disposed at the object side and a second lens group disposed at the image side with a maximum air gap therebetween, and the rear conversion lenses may satisfy the following Expression:

$$0.35<f1/|fRC|≥0.90 \qquad \text{<Expression>}$$

where f1 denotes a focal length of the first lens group and fRC denotes a focal length of the rear conversion lenses.

The rear conversion lenses may satisfy the following Expression:

$$-2.1<f1/f2<-1.1 \qquad \text{<Expression>}$$

where f2 denotes a focal length of the second lens group.

The second lens and the third lens may be cemented together as a doublet lens.

At least one of the first lens, the fourth lens, and the fifth lens may include at least one aspheric surface.

According to an aspect of another embodiment, rear conversion lenses may be disposed at a side of master lenses facing an image side for varying a focal length, and may include: a first lens having a positive refractive power, a second lens having a negative refractive power, a third lens having a positive refractive power, a fourth lens having a positive refractive power, and a fifth lens having a negative refractive power, wherein the first to fifth lenses are sequentially arranged in a direction from an object side to the image side. The rear conversion lenses may satisfy the following Expressions:

$$N1>1.85$$

$$N2>1.85$$

$$N5>1.85 \qquad \text{<Expressions>}$$

where N1 denotes a refractive index of the first lens at a d-line, N2 denotes a refractive index of the second lens at the d-line, and N5 denotes a refractive index of the fifth lens at the d-line.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
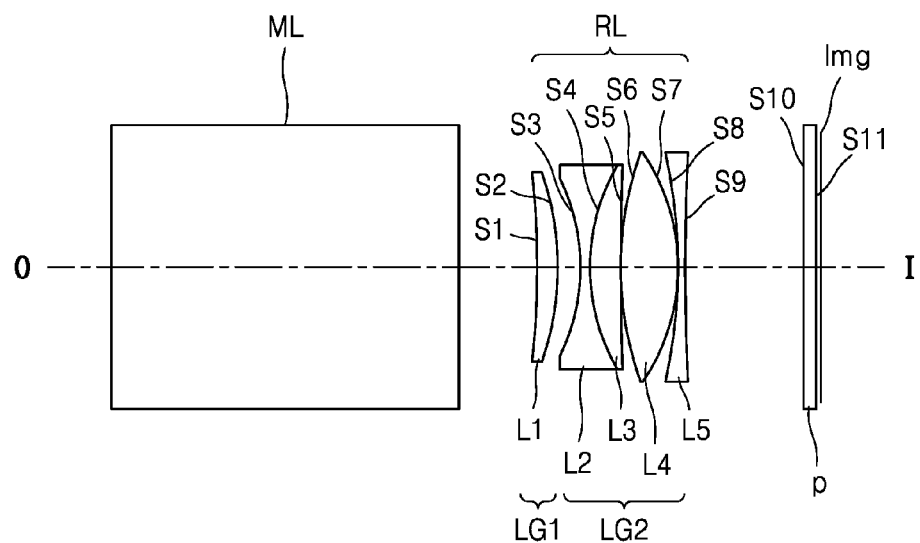
FIG. 1 illustrates rear conversion lenses according to a first embodiment.

Reference will now be made in detail to illustrative embodiments, examples of which are illustrated in the accompanying drawings, wherein like reference numerals refer to like elements throughout. In this regard, the present illustrative embodiments may have different forms and should not be construed as being limited to the descriptions set forth herein. Accordingly, the illustrative embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Rear conversion lenses will now be described according to embodiments with reference to the accompanying drawings.

FIG. 1 illustrates rear conversion lenses RL according to an embodiment.

The rear conversion lenses RL may be disposed at an image side I of a master lenses ML provided in a main body of a photographing device. In the following description, the term "image side I" may refer to a side of an image plane on which an image will be formed, and the term "object side O" may refer to a side of an object to be photographed. The rear conversion lenses RL may be detachably attached to the master lenses ML and may vary a total focal length. For example, the rear conversion lenses RL may increase the total focal length. For example, the rear conversion lenses RL may increase the focal length of the master lenses ML by a factor of 1.4. However, the extent to which the rear conversion lenses RL increases the focal length of the master lenses ML is not limited thereto.

The rear conversion lenses RL of the embodiment may be applied to interchangeable lens cameras having a short flange back such as mirrorless cameras. The term "flange back" refers to the distance from a lens mount surface to an image plane.

The rear conversion lenses RL may include a first lens L1 having a positive refractive power, a second lens L2 having a negative refractive power, a third lens L3 having a positive refractive power, a fourth lens L4 having a positive refractive power, and a fifth lens L5 having a negative refractive power. The first to fifth lenses L1 to L5 may be sequentially arranged in a direction from the object side O to the image side I.

The first lens L1 may have a meniscus shape convex toward the image side I.

For example, the second lens L2 may be a biconcave lens.

The absolute value of the curvature of an object-side surface of the third lens L3 may be greater than the absolute value of the curvature of an image-side surface of the third lens L3. For example, the third lens L3 may have a meniscus shape convex toward the object side O. In addition, the third lens L3 may be a biconvex lens.

For example, the fourth lens L4 may be a biconvex lens.

Figure 2:
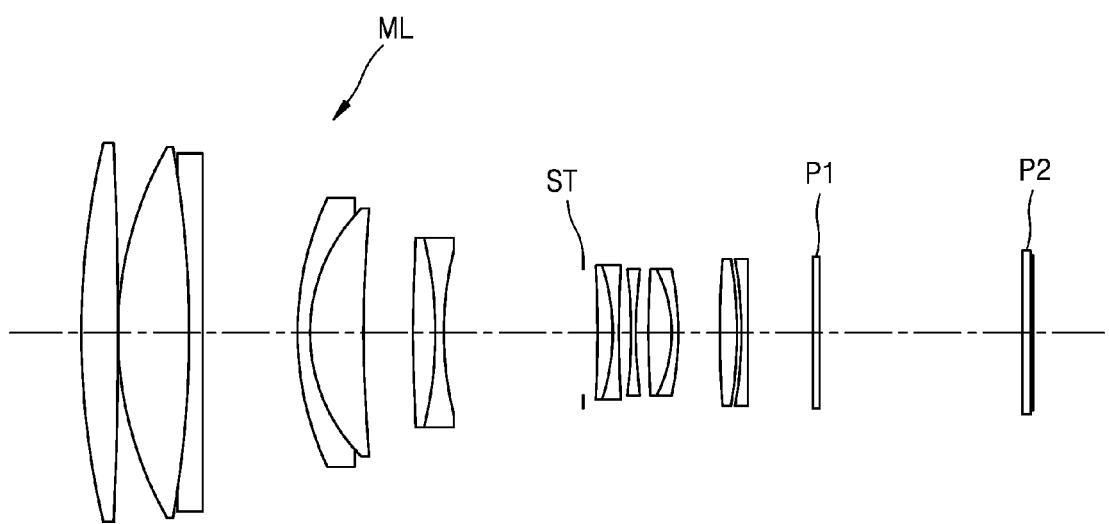
FIG. 2 illustrates master lenses.

FIG. 2 illustrates master lenses ML. Design data of the master lenses ML are as follows. In the following design data, EFL denotes a focal length, BFL denotes a back focal length, RDY denotes a radius of curvature, THI denotes a lens thickness or a lens interval, Nd denotes a refractive index, and Vd refers to an Abbe number.

In this example, the master lenses have the following values: EFL=291.965, BFL=1.000, FNO=2.88, Half angle of view=4.18 deg, and Table 1 shows corresponding values for RDY, THI, Nd, and Vd.

TABLE 1

| Lens surfaces | RDY | THI | Nd | Vd |
|---|---|---|---|---|
| 1 | 207.797 | 10.730 | 1.48749 | 46.0 |
| 2 | −1331.507 | 0.300 | | |
| 3 | 98.708 | 21.000 | 1.43875 | 61.9 |
| 4 | −262.808 | 0.100 | | |
| 5 | −288.092 | 3.500 | 1.78590 | 28.1 |
| 6 | 5388.297 | 28.710 | | |
| 7 | 84.103 | 3.000 | 1.74330 | 31.8 |
| 8 | 46.358 | 0.207 | | |
| 9 | 46.360 | 15.890 | 1.43875 | 61.9 |
| 10 | 366.953 | 15.250 | | |
| 11 | 490.634 | 6.000 | 1.80518 | 15.8 |
| 12 | −106.559 | 2.000 | 1.88300 | 26.1 |
| 13 | 81.365 | 41.750 | | |
| 14(ST) | Infinity | 4.500 | | |
| 15 | −277.940 | 4.100 | 1.84666 | 14.7 |
| 16 | −56.241 | 1.800 | 1.60311 | 39.4 |
| 17 | 148.641 | 3.700 | | |
| 18 | −158.269 | 1.800 | 1.80610 | 20.9 |
| 19 | 123.928 | 3.400 | | |
| 20 | 209.019 | 6.730 | 1.80420 | 29.8 |
| 21 | −39.192 | 1.800 | 1.84666 | 14.7 |
| 22 | −116.747 | 12.750 | | |
| 23 | 253.967 | 5.260 | 1.88100 | 25.6 |
| 24 | −89.594 | 1.110 | | |
| 25 | −84.359 | 1.500 | 1.51742 | 33.5 |
| 26 | 1457.940 | 20.000 | | |
| 27 | Infinity | 1.500 | 1.51680 | 41.8 |
| 28 | Infinity | 60.284 | | |
| 29 | Infinity | 2.000 | 1.51680 | 41.8 |
| 30 | Infinity | 1.000 | | |

The design data of the master lenses ML shown in Table 1 are exemplary data, and are not limited thereto. In general, rear conversion lenses which have a negative lens group such as telephoto lenses may be added to mater lenses whose aberrations are already corrected, thereby resulting in a negative Petzval sum. Therefore, adjustment of the refractive index of each of the rear conversion lenses RL may be important for correcting the Petzval sum. In addition, the rear conversion lenses RL may be designed for use in a mirrorless camera having a relatively short flange back compared to a single-lens reflex camera having a mirror. If the focal length of the master lenses ML is increased, for example, by a factor of 1.4, the image distance of the rear conversion lenses RL may be decreased because of a short flange back, and off-axis rays may be refracted at relatively large angles compared to the case of forming the same image circle. Therefore, it may be more difficult to design a mirrorless camera using the rear conversion lenses RL than to design a single-lens reflex camera having a mirror.

The first lens L1 may satisfy Expression 1 below:

$$N1 > 1.85 \qquad (1)$$

where N1 denotes the refractive index of the first lens L1 at a d-line. A d-line is a spectral absorption line which has a well defined wavelength and can be used to characterize the refractive index of an optical material. For example, the d-line may be 587.5618 nm.

When the first lens L1 has a refractive index described in Expression 1, the rear conversion lenses RL may be applied to a photographing device having a short flange back.

To cope with a short flange back, the first lens L1 being a positive lens may be combined with a negative lens disposed at an image side of the first lens L1 with an air gap therebetween, so as to form a kind of telephoto lens group and thus to move the rear principal point of the rear conversion lenses RL toward the object side O. Then, even though the flange back is short, the image distance of the rear conversion lenses RL may be increased a little bit, and thus the refraction angle of off-axis rays may be decreased. Since the first lens L1 has a relatively high refractive power, aberrations, such as a spherical aberration or a coma aberration, may be reduced using the high refractive index of the first lens L1.

The second lens L2 may satisfy Expression 2 below:

$$N2 > 1.85 \qquad (2)$$

where N2 denotes the refractive index of the second lens L2 at the d-line.

The fifth lens L5 may satisfy Expression 3 below:

$$N5 > 1.85 \qquad (3)$$

where N5 denotes the refractive index of the fifth lens L5 at the d-line.

For example, if each of the second lens L2 and the fifth lens L5 includes or is formed from a material having a refractive index of 1.85 or greater, the Petzval sum may be easily corrected. Since each of the second lens L2 and the fifth lens L5 is a negative lens, if the second lens L2 and the fifth lens L5 have high refractive indexes, a negative value of the Petzval sum may be reduced. not have a negative value That is, the absolute value of the Petzval sum may be reduced using the high refractive indexes of the second lens L2 and the third lens L3.

If each of the first lens L1, the second lens L2, and the fifth lens L5 has a refractive index of 2 or greater, the degree of freedom in designing lenses for a short flange back may be increased.

The fourth lens L4 may satisfy Expression 4 below:

$$N4 < 1.65 \qquad (4)$$

where N4 denotes the refractive index of the fourth lens L4 at the d-line.

Expression 4 describes the refractive index of the fourth lens L4. Since each of the first lens L1, the second lens L2, and the fifth lens L5 includes material having a relatively high refractive index, the fourth lens L4 being a positive lens may include or be formed from a material having a relatively low refractive index according to a principal of Petzval sum correction. However, the refractive index of the fourth lens L4 may be within the range described in Expression 4 for the balance with the other lenses.

The rear conversion lenses RL may satisfy Expression 5 below:

$$0.8 < fbRC/Y < 1.2 \qquad (5)$$

where fbRC denotes the back focal length of the rear conversion lenses RL at a predetermined magnification, and Y denotes a maximum image height.

Expression 5 describes the ratio of the back focal length to the maximum image height of the rear conversion lenses RL. If fbRC/Y is greater than the upper limit in Expression 5, that is, the back focal length of the rear conversion lenses RL is relatively long, the size of the rear conversion lenses RL may increase when the rear conversion lenses RL are applied to a photographing device having a short flange back. Interchangeable lenses for interchangeable lens cameras have lens interchange mounts and may be designed according to the flange backs of the interchangeable lens cameras. Therefore, interchange lenses for a short flange back may have a short distance between a mount surface and an image surface. In other words, the object distance of the rear conversion lenses RL is short. It is difficult to maintain an intended or desired magnification if the back focal length of the rear conversion lenses RL is excessively long relative to the short object distance of the rear conversion lenses RL.

If fbRC/Y is smaller than the lower limit in Expression 5, that is, if the back focal length of the rear conversion lenses RL is short, the rear principal point of the rear conversion lenses RL does not move to the object side O. Thus, it difficult to design the rear conversion lenses RL in the case where the image distance of the rear conversion lenses RL is short as the refraction angles of off-axis rays are increased.

The rear conversion lenses RL may be divided into a first lens group LG1 disposed at the object side O and a second lens group LG2 disposed at the image side I. A maximum air gap may be formed between the first and second lens groups LG1 and LG2. The rear conversion lenses RL may satisfy Expression 6 below:

$$0.35 < f1/|fRC| < 0.90 \tag{6}$$

where f1 denotes the focal length of the first lens group LG1 and fRC denotes the focal length of the rear conversion lenses RL.

Expression 6 describes the ratio of the focal length of the first lens group LG1 to the absolute value of the focal length of the rear conversion lenses RL when the rear conversion lenses RL are divided into the first lens group LG1 and the second lens group LG2 with the maximum air gap therebetween. For example, referring to FIG. 1, the gap between the first lens L1 and the second lens L2 may be the maximum air gap. The first lens group LG1 may include the first lens L1, and the second lens group LG2 may include the second lens L2, the third lens L3, fourth lens L4, and the fifth lens L5. The reference number LG1 indicating the first lens group and the reference number LG2 indicating the second lens group are only shown in FIG. 1.

Principal points of the rear conversion lenses RL may be adjusted according to a reference short flange back by disposing the second lens group LG2 having a negative total refractive power at the image side I of the first lens L1 with an air gap being formed between the first lens L1 and the second lens group LG2.

In this case, due to mechanical conditions such as mounting conditions of the rear conversion lenses RL, if the rear conversion lenses RL have almost no air gap and a short length, the shifting of the principal points of the rear conversion lenses RL may be related with the entrance pupil of the rear conversion lenses RL.

In addition, when rays condensed by the first lens group LG1 are incident on a concave surface of the second lens L2 being a negative lens disposed at a side of the first lens group LG1 with an air gap therebetween, spherical aberration and coma may be corrected by adjusting the incident height of the rays.

If f1/|fRC| is greater than the upper limit in Expression 6, in other words, when the focal length of the first lens group LG1 is long and the power of the first lens group LG1 is low, aberrations of the first lens group LG1 may be reduced as a result. However, the effect of reducing aberrations by the concave surface of the second lens L2 is lowered, thereby causing the overall aberration correction to be insufficient. Furthermore, the rear principal point of the rear conversion lenses RL may move toward the image side I, thereby decreasing the image distance of the rear conversion lenses RL and increasing the refraction angles of off-axis rays, and making it difficult to design the rear conversion lenses RL.

If f1/|fRC| is less than the lower limit in Expression 6, in other words when the focal length of the first lens group LG1 is short, the rear principal point of the rear conversion lenses RL moves toward the object side O. Thus, as the image distance of the rear conversion lenses RL increases, the refraction angles of off-axis rays may decrease and the aberrations of the first lens group LG1 may increase.

The rear conversion lenses RL may satisfy Expression 7 below:

$$-2.1 < f1/f2 < -1.1 \tag{7}$$

where f1 denotes the focal length of the first lens group LG1, and f2 denotes the focal length of the second lens group LG2.

Expression 7 describes the ratio of the focal length of the first lens group LG1 to the focal length of the second lens group LG2 when the rear conversion lenses RL are divided into the first lens group LG1 and the second lens group LG2 with the maximum air gap therebetween.

If f1/f2 is greater than the upper limit in Expression 7, the focal length of the second lens group LG2 increases in a negative direction. That is, if the negative refractive power of the second lens group LG2 decreases, the rear principal point of the rear conversion lenses RL may move to the object side O. However, it may be required to decrease the refractive power of the first lens group LG1 together with the refractive power of the second lens group LG2 so as to maintain the magnification and rear principal point of the rear conversion lenses RL. Accordingly, it may be difficult to reduce the aberrations of the rear conversion lenses RL through destructive interference between aberrations of the first and second lens groups LG1 and LG2.

If f1/f2 is less than the lower limit in Expression 7, in other words, when the negative focal length of the second lens group LG2 is shortened, the negative refractive power of the second lens group LG2 increases and the rear principal point of the rear conversion lenses RL moves to the image side I, the refractive angles of off-axis rays are increased. In addition, if the negative refractive power of the second lens group LG2 excessively increases, it may be difficult to properly correct the Petzval sum even though the rear conversion lenses RL satisfy Expressions 3 and 4.

If the rear conversion lenses RL has an aspheric surface, positive distortion caused by a negative refractive power at the image side of the master lenses ML may be corrected. The aspheric surface may be an aspheric surface formed on glass by molding, and the material from which it is formed (e.g., glass) may have a low transition point. However, the aspheric surface may not be an aspheric surface of a doublet lens because doublet lenses have no refractive index difference between negative and positive lenses and no degree of freedom in selection of an Abbe number for correcting chromatic aberrations.

For example, the second lens L2 and the third lens L3 may be cemented or otherwise bonded or secured together as a doublet lens. One of the first lens L1, the fourth lens L4, and the fifth lens L5 may have an aspheric surface.

The rear conversion lenses RL of the embodiment may be applied to a short flange back system for cameras, camcorders, etc.

In the description of the rear conversion lenses RL of the embodiment, the term "aspheric" or "aspheric surface" has the following definition.

When an optical axis is set as an x-axis, a direction perpendicular to the optical axis is set as a y-axis, and the propagation direction of rays is denoted as a positive direction, an aspheric surface of a lens may be defined by Expression 8. In Expression 8, x denotes a distance measured from the vertex of the lens in the direction of the optical axis of the lens, y denotes a distance measured from the optical axis in a direction perpendicular to the optical axis, K denotes a conic constant, a, b, c, and d denote aspheric coefficients, and c denotes the reciprocal (1/R) of the radius of curvature at the vertex of the lens.

$$x = \frac{Cy^2}{1 + \sqrt{1 - (K+1)C^2y^2}} + ay^4 + by^6 + cy^8 + dy^{10} \quad (8)$$

Variously designed rear conversion lenses may be provided according to numeral embodiments as described below. In the following explanation, EFL denotes a total focal length in millimeters (mm), BFL denotes a back focal length, FNO denotes an F number, and w denotes a half angle of view in degrees. The EFL, FNO, and w may be assigned values in which the rear conversion lenses of the embodiments are combined with the master lenses ML shown in FIG. 2. However, the master lenses ML are not limited to those shown in FIG. 2. That is, the master lenses ML may be varied.

RDY denotes a radius of curvature, THI denotes a lens thickness or a lens interval, Nd denotes a refractive index, and Vd denotes an Abbe number. As shown in each of the drawings of the embodiments, at least one filter P may be disposed at a position closest to an image side I. The filter P may include one of a low pass filter, an infrared (IR)-cut filter, and a cover glass. However, the rear conversion lenses may not include any filter. In the drawings, Img denotes an image plane or an image sensor.

First Embodiment

FIG. 1 illustrates the rear conversion lenses RL according to a first numeral embodiment, and design data for the master lenses ML and the rear conversion lenses RL of the first embodiment are shown below. In Table 2, lens surfaces of the master lenses ML are sequentially numbered in a direction from the object side O to the image side I, and as shown in Table 2 and FIG. 1, lens surfaces of the rear conversion lenses RL are sequentially numbered with S1, S2, . . . , Sn (where n denotes a natural number) in a direction from the object side O to the image side I. In the following description, design data of the embodiments are shown in the same manner. For example, the Table 2 shows values for RDY, THI, Nd, and Vd, where EFL=408.738, BFL=1.000, FNO=4.03, w=3.00 deg, Magnification=1.40

TABLE 2

| Lens surfaces | RDY | THI | Nd | Vd |
|---|---|---|---|---|
| 1 | 207.797 | 10.730 | 1.48749 | 70.4 |
| 2 | −1331.507 | 0.300 | | |
| 3 | 98.708 | 21.000 | 1.43875 | 94.9 |
| 4 | −262.808 | 0.100 | | |
| 5 | −288.092 | 3.500 | 1.78590 | 43.9 |
| 6 | 5388.297 | 28.710 | | |
| 7 | 84.103 | 3.000 | 1.74330 | 49.2 |
| 8 | 46.358 | 0.207 | | |
| 9 | 46.360 | 15.890 | 1.43875 | 94.9 |
| 10 | 366.953 | 15.250 | | |
| 11 | 490.634 | 6.000 | 1.80518 | 25.5 |

TABLE 2-continued

| Lens surfaces | RDY | THI | Nd | Vd |
|---|---|---|---|---|
| 12 | −106.559 | 2.000 | 1.88300 | 40.8 |
| 13 | 81.365 | 41.750 | | |
| 14(ST) | Infinity | 4.500 | | |
| 15 | −277.940 | 4.100 | 1.84666 | 23.8 |
| 16 | −56.241 | 1.800 | 1.60311 | 60.7 |
| 17 | 148.641 | 3.700 | | |
| 18 | −158.269 | 1.800 | 1.80610 | 33.3 |
| 19 | 123.928 | 3.400 | | |
| 20 | 209.019 | 6.730 | 1.80420 | 46.5 |
| 21 | −39.192 | 1.800 | 1.84666 | 23.8 |
| 22 | −116.747 | 12.750 | | |
| 23 | 253.967 | 5.260 | 1.88100 | 40.1 |
| 24 | −89.594 | 1.110 | | |
| 25 | −84.359 | 1.500 | 1.51742 | 52.2 |
| 26 | 1457.940 | 20.000 | | |
| 27 | Infinity | 1.500 | 1.51680 | 64.2 |
| 28 | Infinity | 33.075 | | |
| S1 | −112.450 | 3.080 | 2.10420 | 17.0 |
| S2 | −45.376 | 4.168 | | |
| S3 | −31.019 | 1.500 | 2.00100 | 29.1 |
| S4 | 29.455 | 5.345 | 1.71736 | 29.5 |
| S5 | 338.930 | 0.100 | | |
| S6 | 53.397 | 9.671 | 1.58144 | 40.9 |
| S7 | −32.800 | 0.100 | | |
| S8 | −90.210 | 1.400 | 2.00100 | 29.1 |
| S9 | 417.845 | 20.239 | | |
| S10 | Infinity | 2.000 | 1.51680 | 64.2 |
| S11 | Infinity | 1.000 | | |

Figure 3:
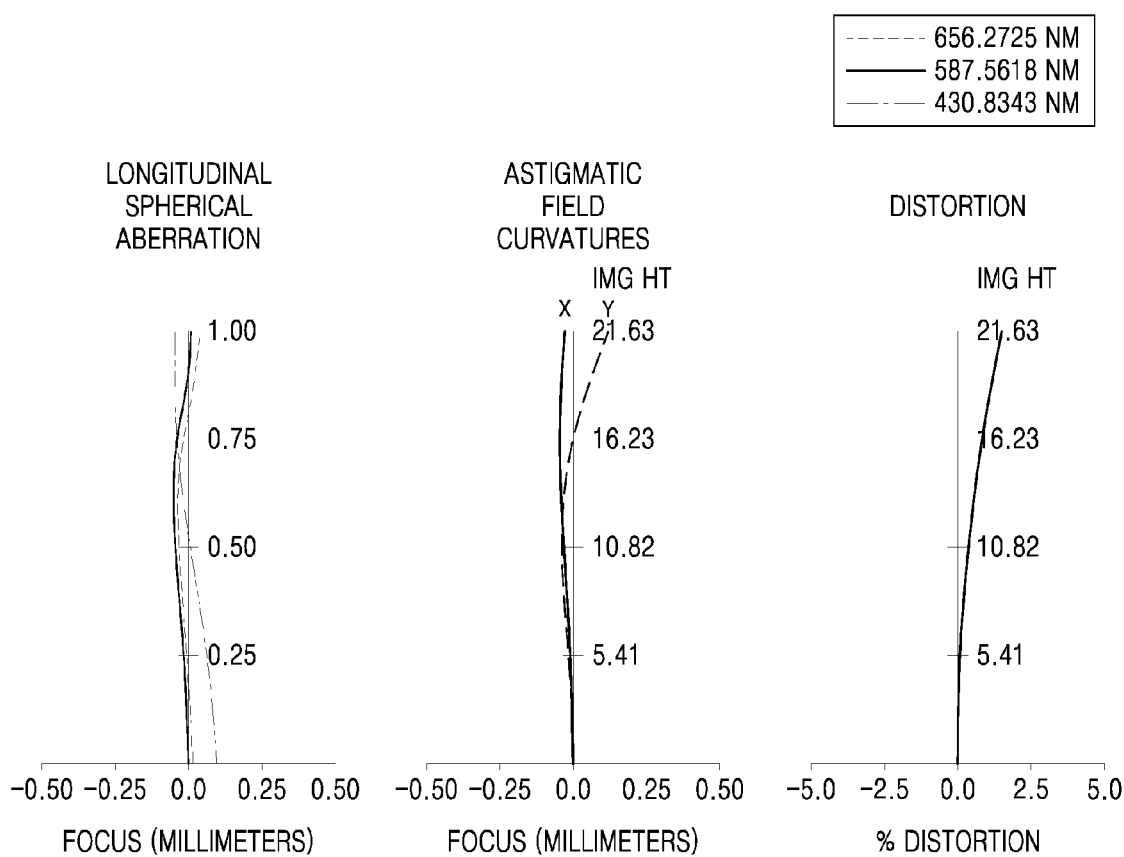
FIG. 3 illustrates spherical aberration, astigmatic field curvatures, and distortion of the master lenses illustrated in FIG. 2.

FIG. 3 illustrates spherical aberration, astigmatic field curves, and distortion of the master lenses illustrated in FIG. 2.

Figure 4:
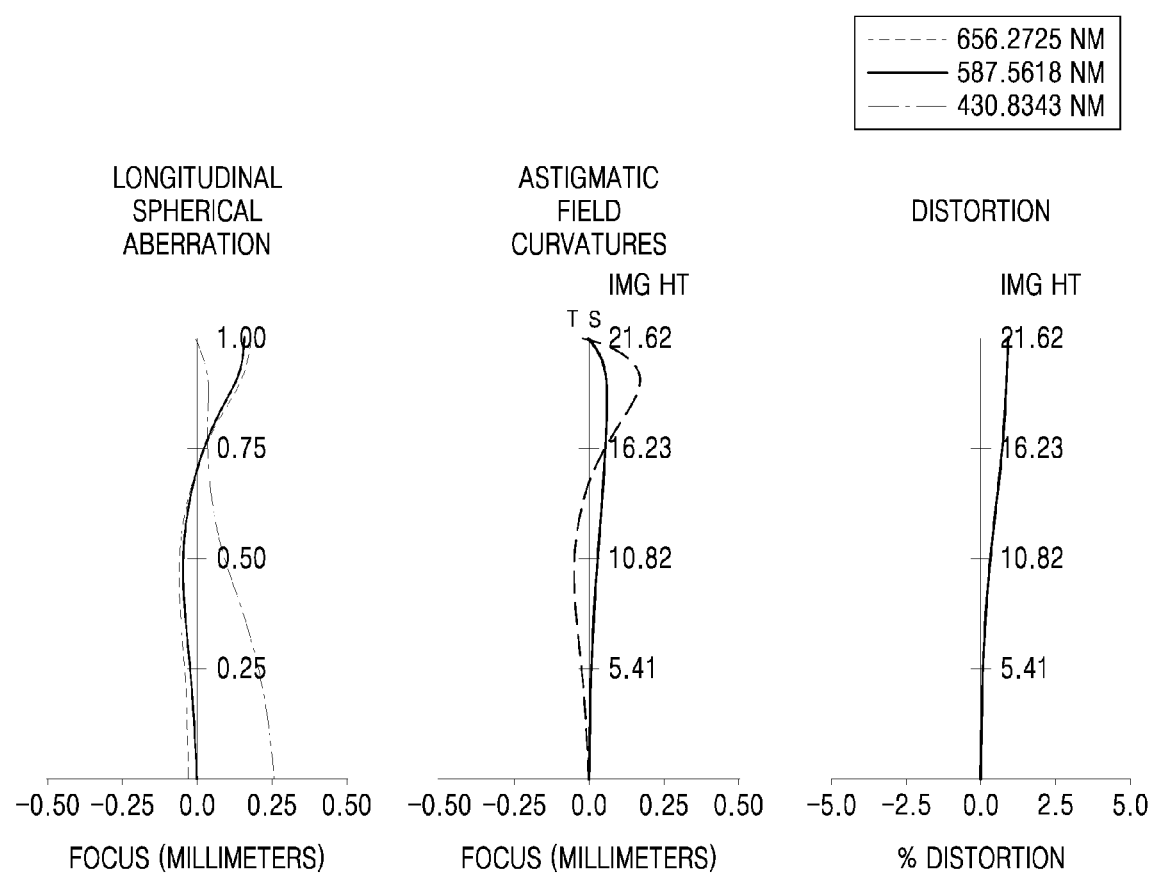
FIG. 4 illustrates aberrations of a lens system in which the master lenses ML are combined with the rear conversion lenses of the first embodiment.

FIG. 4 illustrates longitudinal spherical aberration, astigmatic field curves, and distortion of a lens system (constituted by the master lenses ML and the rear conversion lenses RL) of the first embodiment. The astigmatic field curves include a tangential field curvature T and a sagittal field curvature S.

Second Embodiment

Figure 5:
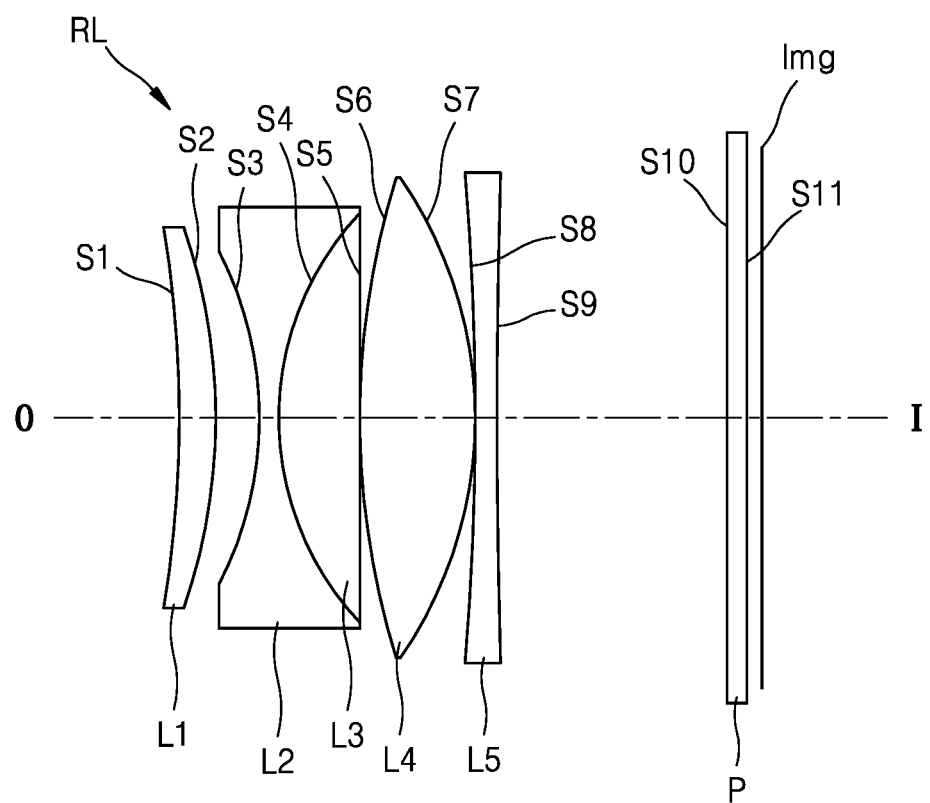
FIG. 5 illustrates rear conversion lenses according to a second embodiment.

FIG. 5 illustrates rear conversion lenses RL according to a second numeral embodiment, and design data for master lenses ML and the rear conversion lenses RL of the second embodiment are shown below.
EFL=408.738, BFL=1.000, FNO=4.03, w=3.045 deg, Magnification=1.4

TABLE 3

| Lens surfaces | RDY | THI | Nd | Vd |
|---|---|---|---|---|
| 1 | 207.797 | 10.730 | 1.48749 | 70.4 |
| 2 | −1331.507 | 0.300 | | |
| 3 | 98.708 | 21.000 | 1.43875 | 94.9 |
| 4 | −262.808 | 0.100 | | |
| 5 | −288.092 | 3.500 | 1.78590 | 43.9 |
| 6 | 5388.297 | 28.710 | | |
| 7 | 84.103 | 3.000 | 1.74330 | 49.2 |
| 8 | 46.358 | 0.207 | | |
| 9 | 46.360 | 15.890 | 1.43875 | 94.9 |
| 10 | 366.953 | 15.250 | | |
| 11 | 490.634 | 6.000 | 1.80518 | 25.5 |
| 12 | −106.559 | 2.000 | 1.88300 | 40.8 |
| 13 | 81.365 | 41.750 | | |
| 14(ST) | Infinity | 4.500 | | |
| 15 | −277.940 | 4.100 | 1.84666 | 23.8 |
| 16 | −56.241 | 1.800 | 1.60311 | 60.7 |
| 17 | 148.641 | 3.700 | | |
| 18 | −158.269 | 1.800 | 1.80610 | 33.3 |

TABLE 3-continued

| Lens surfaces | RDY | THI | Nd | Vd |
|---|---|---|---|---|
| 19 | 123.928 | 3.400 | | |
| 20 | 209.019 | 6.730 | 1.80420 | 46.5 |
| 21 | −39.192 | 1.800 | 1.84666 | 23.8 |
| 22 | −116.747 | 12.750 | | |
| 23 | 253.967 | 5.260 | 1.88100 | 40.1 |
| 24 | −89.594 | 1.110 | | |
| 25 | −84.359 | 1.500 | 1.51742 | 52.2 |
| 26 | 1457.940 | 20.000 | | |
| 27 | Infinity | 1.500 | 1.51680 | 64.2 |
| 28 | Infinity | 33.076 | | |
| S1 | −111.207 | 3.134 | 2.10420 | 17.0 |
| S2 | −44.202 | 4.199 | | |
| S3 | −29.475 | 1.500 | 2.00100 | 29.1 |
| S4 | 23.932 | 6.765 | 1.76182 | 26.6 |
| S5 | 313.274 | 0.100 | | |
| S6 | 63.960 | 9.935 | 1.58320 | 59.2 |
| S7 | −37.210 | 0.100 | | |
| S8 | −320.861 | 1.400 | 2.00100 | 29.1 |
| S9 | 246.750 | 20.243 | | |
| S10 | Infinity | 2.000 | 1.51680 | 64.2 |
| S11 | Infinity | 1.000 | | |

Table 4 below shows aspheric coefficients in the second embodiment.

TABLE 4

| Lens surfaces | K | a | b | c |
|---|---|---|---|---|
| S7 | −1.0000 | −7.52752e−006 | 2.32905e−010 | −1.80779e−011 |

Figure 6:
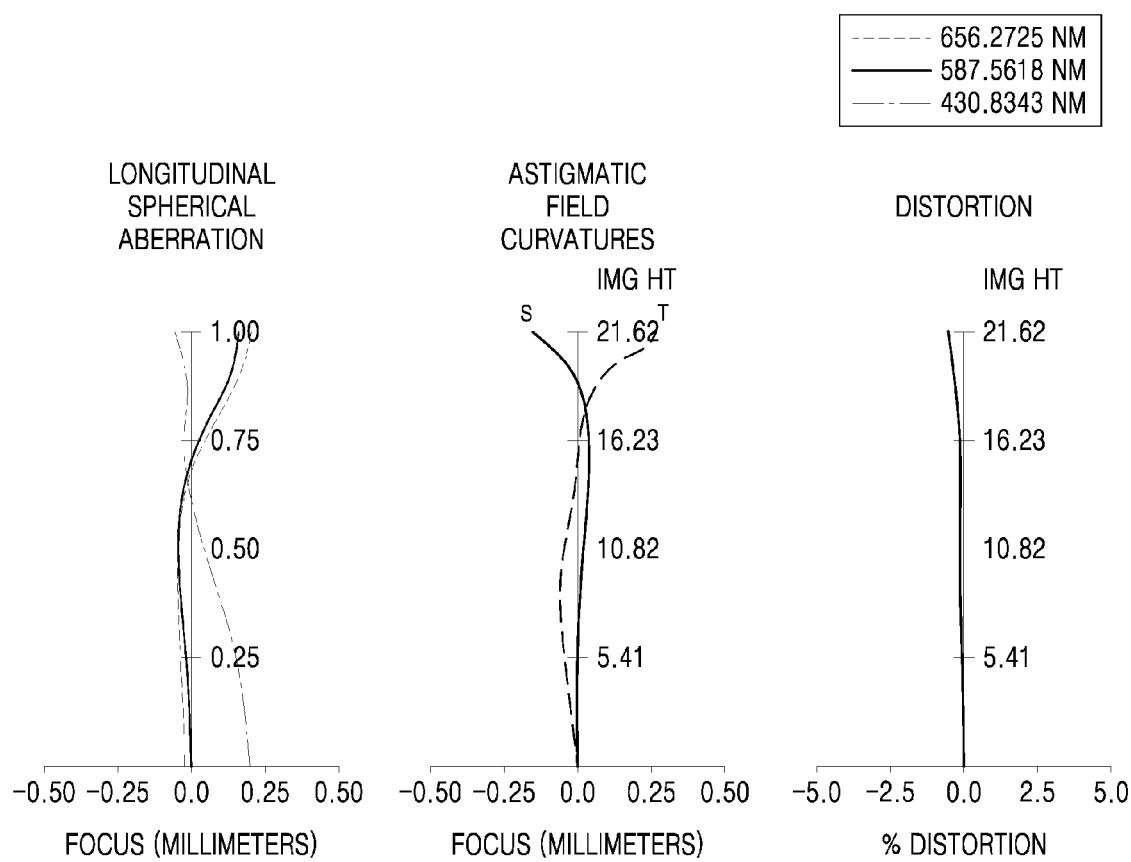
FIG. 6 illustrates aberrations of a lens system in which master lenses ML are combined with the rear conversion lenses of the second embodiment.

FIG. 6 illustrates longitudinal spherical aberration, astigmatic field curves, and distortion of a lens system (constituted by the master lenses ML and the rear conversion lenses RL) of the second embodiment.

Third Embodiment

Figure 7:
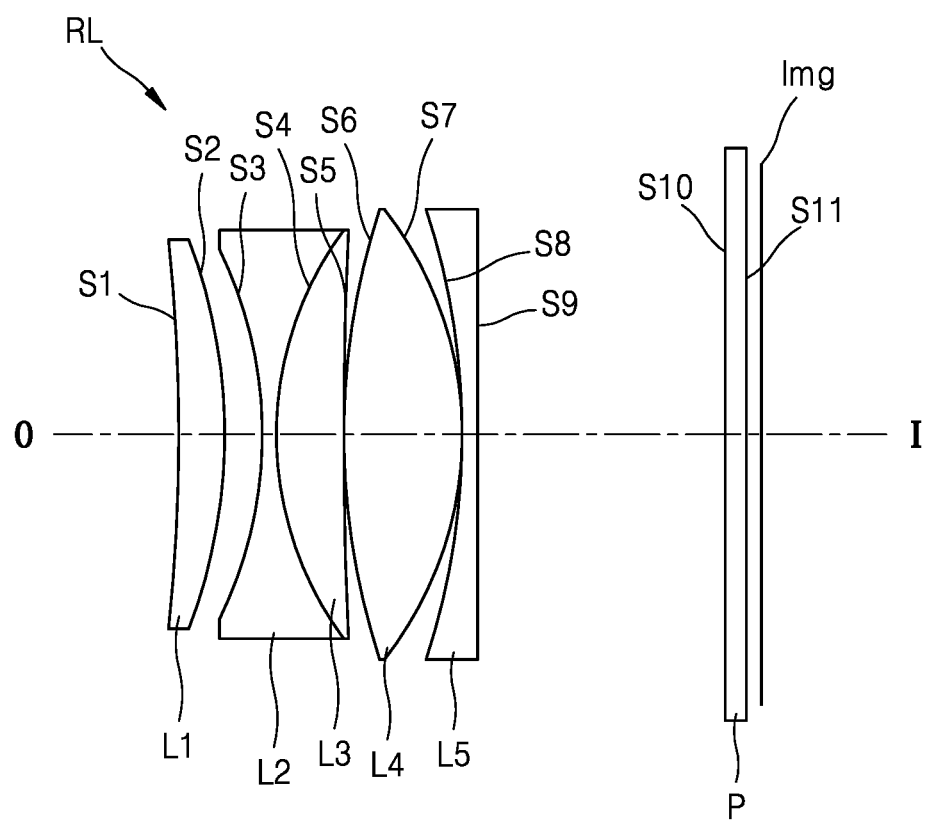
FIG. 7 illustrates rear conversion lenses according to a third embodiment.

FIG. 7 illustrates rear conversion lenses RL according to a third numeral embodiment, and design data for master lenses ML and the rear conversion lenses RL of the third embodiment are shown below.
EFL=408.737, BFL=1.000, FNO=4.03, w=2.97 deg, Magnification=1.4

TABLE 5

| Lens surfaces | RDY | THI | Nd | Vd |
|---|---|---|---|---|
| 1 | 207.797 | 10.730 | 1.48749 | 70.4 |
| 2 | −1331.507 | 0.300 | | |
| 3 | 98.708 | 21.000 | 1.43875 | 94.9 |
| 4 | −262.808 | 0.100 | | |
| 5 | −288.092 | 3.500 | 1.78590 | 43.9 |
| 6 | 5388.297 | 28.710 | | |
| 7 | 84.103 | 3.000 | 1.74330 | 49.2 |
| 8 | 46.358 | 0.207 | | |
| 9 | 46.360 | 15.890 | 1.43875 | 94.9 |
| 10 | 366.953 | 15.250 | | |
| 11 | 490.634 | 6.000 | 1.80518 | 25.5 |
| 12 | −106.559 | 2.000 | 1.88300 | 40.8 |
| 13 | 81.365 | 41.750 | | |
| 14(ST) | Infinity | 4.500 | | |
| 15 | −277.940 | 4.100 | 1.84666 | 23.8 |
| 16 | −56.241 | 1.800 | 1.60311 | 60.7 |
| 17 | 148.641 | 3.700 | | |
| 18 | −158.269 | 1.800 | 1.80610 | 33.3 |
| 19 | 123.928 | 3.400 | | |
| 20 | 209.019 | 6.730 | 1.80420 | 46.5 |

TABLE 5-continued

| Lens surfaces | RDY | THI | Nd | Vd |
|---|---|---|---|---|
| 21 | −39.192 | 1.800 | 1.84666 | 23.8 |
| 22 | −116.747 | 12.750 | | |
| 23 | 253.967 | 5.260 | 1.88100 | 40.1 |
| 24 | −89.594 | 1.110 | | |
| 25 | −84.359 | 1.500 | 1.51742 | 52.2 |
| 26 | 1457.940 | 20.000 | | |
| 27 | Infinity | 1.500 | 1.51680 | 64.2 |
| 28 | Infinity | 33.083 | | |
| S1 | −118.015 | 3.408 | 2.00178 | 19.3 |
| S2 | −39.014 | 3.108 | | |
| S3 | −32.870 | 1.500 | 2.00100 | 29.1 |
| S4 | 26.058 | 5.683 | 1.80518 | 25.5 |
| S5 | 204.276 | 0.100 | | |
| S6 | 54.464 | 9.824 | 1.57501 | 41.5 |
| S7 | −28.153 | 0.100 | | |
| S8 | −48.242 | 1.400 | 2.00100 | 29.1 |
| S9 | 4816.097 | 20.224 | | |
| S10 | Infinity | 2.000 | 1.51680 | 64.2 |
| S11 | Infinity | 1.000 | | |

Table 6 below shows aspheric coefficients in the third embodiment.

TABLE 6

| Lens surfaces | K | a | b | c |
|---|---|---|---|---|
| S2 | −1.0000 | −1.04196e−007 | 1.31335e−009 | 3.74857e−012 |

Figure 8:
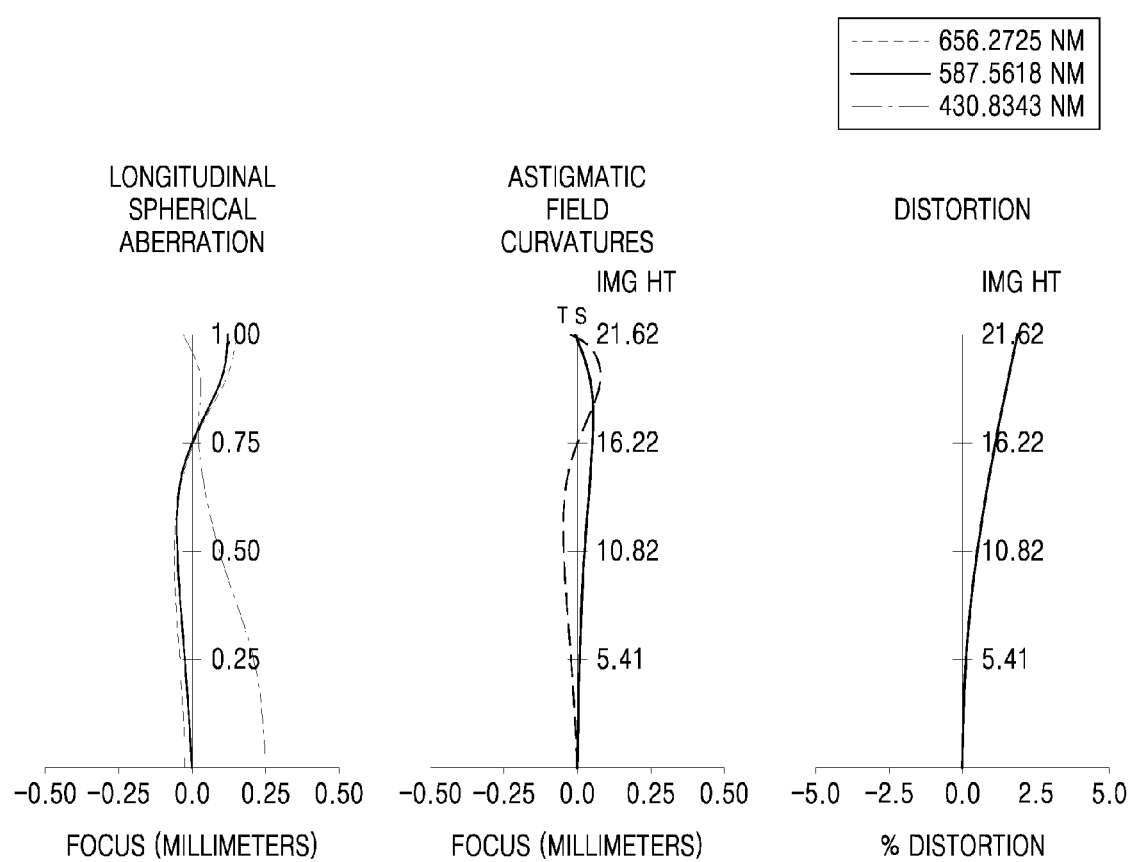
FIG. 8 illustrates aberrations of a lens system in which master lenses ML are combined with the rear conversion lenses of the third embodiment.

FIG. 8 illustrates longitudinal spherical aberration, astigmatic field curves, and distortion of a lens system (constituted by the master lenses ML and the rear conversion lenses RL) of the third embodiment.

Fourth Embodiment

Figure 9:
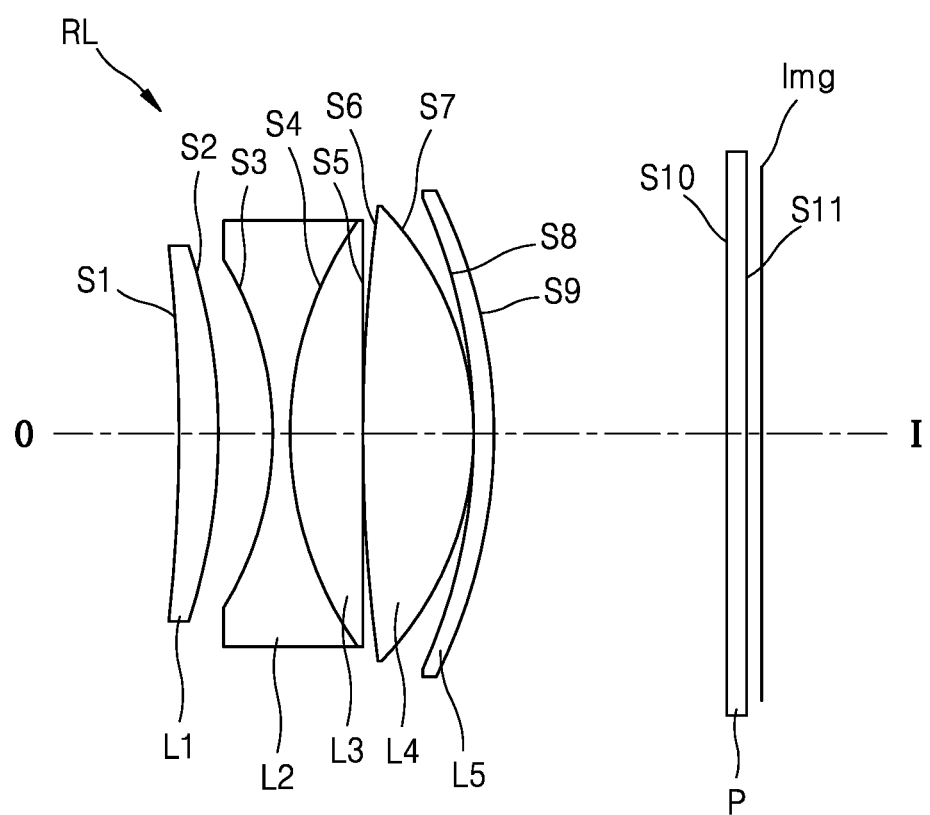
FIG. 9 illustrates rear conversion lenses according to a fourth embodiment.

FIG. 9 illustrates rear conversion lenses RL according to a fourth numeral embodiment, and design data for master lenses ML and the rear conversion lenses RL of the fourth embodiment are shown below.
Table 7 below lists values for R, TH, Nd, and Vd, where EFL=408.738, BFL=1.000, FNO=4.03, Half angle of view=3.04 deg, Magnification=1.4.

TABLE 7

| Lens surfaces | R | TH | Nd | Vd |
|---|---|---|---|---|
| 1 | 207.797 | 10.730 | 1.48749 | 70.4 |
| 2 | −1331.507 | 0.300 | | |
| 3 | 98.708 | 21.000 | 1.43875 | 94.9 |
| 4 | −262.808 | 0.100 | | |
| 5 | −288.092 | 3.500 | 1.78590 | 43.9 |
| 6 | 5388.297 | 28.710 | | |
| 7 | 84.103 | 3.000 | 1.74330 | 49.2 |
| 8 | 46.358 | 0.207 | | |
| 9 | 46.360 | 15.890 | 1.43875 | 94.9 |
| 10 | 366.953 | 15.250 | | |
| 11 | 490.634 | 6.000 | 1.80518 | 25.5 |
| 12 | −106.559 | 2.000 | 1.88300 | 40.8 |
| 13 | 81.365 | 41.750 | | |
| 14(ST) | Infinity | 4.500 | | |
| 15 | −277.940 | 4.100 | 1.84666 | 23.8 |
| 16 | −56.241 | 1.800 | 1.60311 | 60.7 |
| 17 | 148.641 | 3.700 | | |
| 18 | −158.269 | 1.800 | 1.80610 | 33.3 |
| 19 | 123.928 | 3.400 | | |
| 20 | 209.019 | 6.730 | 1.80420 | 46.5 |

TABLE 7-continued

| Lens surfaces | R | TH | Nd | Vd |
|---|---|---|---|---|
| 21 | −39.192 | 1.800 | 1.84666 | 23.8 |
| 22 | −116.747 | 12.750 | | |
| 23 | 253.967 | 5.260 | 1.88100 | 40.1 |
| 24 | −89.594 | 1.110 | | |
| 25 | −84.359 | 1.500 | 1.51742 | 52.2 |
| 26 | 1457.940 | 20.000 | | |
| 27 | Infinity | 1.500 | 1.51680 | 64.2 |
| 28 | Infinity | 33.051 | | |
| S1 | −110.800 | 3.106 | 2.10420 | 17.0 |
| S2 | −44.645 | 4.819 | | |
| S3 | −27.342 | 1.500 | 2.00100 | 29.1 |
| S4 | 28.434 | 6.545 | 1.72825 | 28.3 |
| S5 | −339.284 | 0.100 | | |
| S6 | 185.368 | 9.374 | 1.51742 | 52.2 |
| S7 | −26.442 | 0.100 | | |
| S8 | −35.402 | 1.400 | 2.00178 | 19.3 |
| S9 | −46.669 | 20.288 | | |
| S10 | Infinity | 2.000 | 1.51680 | 64.2 |
| S11 | Infinity | 1.000 | | |

Table 8 below shows aspheric coefficients in the fourth embodiment.

TABLE 8

| Lens surfaces | K | a | b | c | d |
|---|---|---|---|---|---|
| S8 | −1.0000 | 8.25968e−007 | 1.00264e−009 | −1.93563e−012 | 2.79930e−014 |

Figure 10:
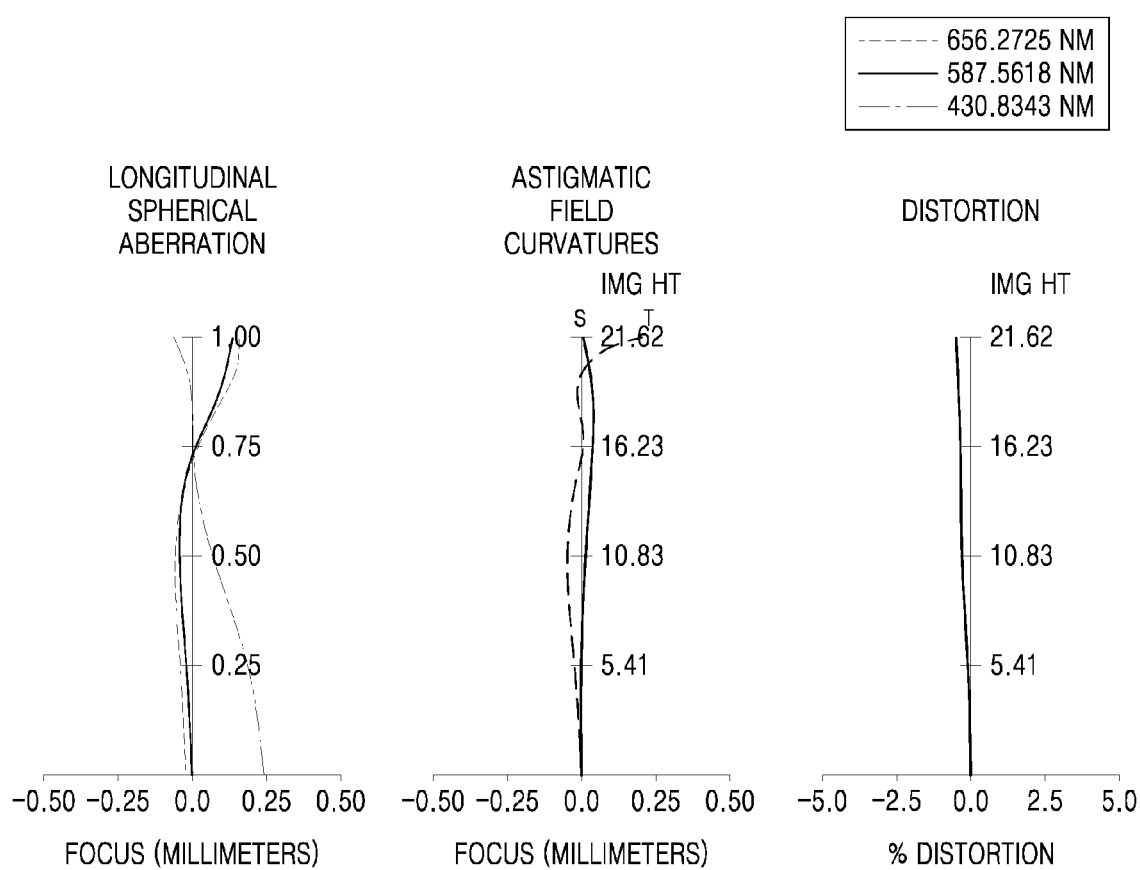
FIG. 10 illustrates aberrations of a lens system in which master lenses ML are combined with the rear conversion lenses of the fourth embodiment.

FIG. 10 illustrates longitudinal spherical aberration, astigmatic field curves, and distortion of a lens system (constituted by the master lenses ML and the rear conversion lenses RL) of the fourth embodiment.

Fifth Embodiment

Figure 11:
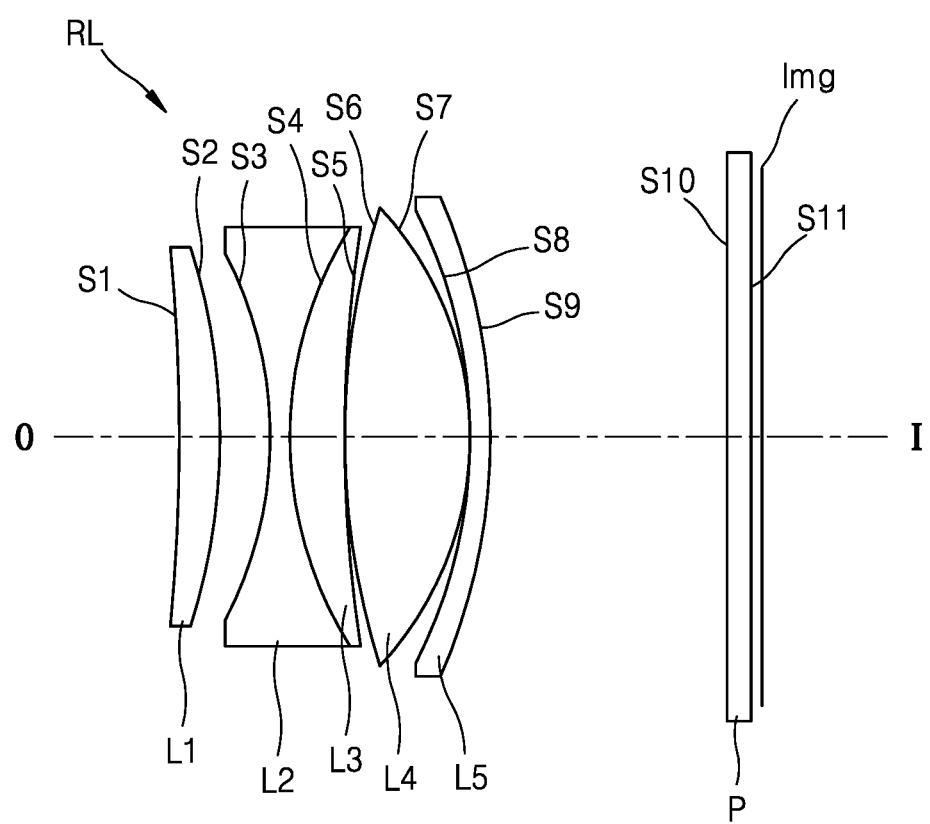
FIG. 11 illustrates rear conversion lenses according to a fifth embodiment.

FIG. 11 illustrates rear conversion lenses RL according to a fifth numeral embodiment, and design data for master lenses ML and the rear conversion lenses RL of the fifth embodiment are shown below.
EFL=408.738, BFL=1.000, FNO=4.03, w=3.04 deg, Magnification=1.4

TABLE 9

| Lens surfaces | R | TH | Nd | Vd |
|---|---|---|---|---|
| 1 | 207.797 | 10.730 | 1.48749 | 70.4 |
| 2 | −1331.507 | 0.300 | | |
| 3 | 98.708 | 21.000 | 1.43875 | 94.9 |
| 4 | −262.808 | 0.100 | | |
| 5 | −288.092 | 3.500 | 1.78590 | 43.9 |
| 6 | 5388.297 | 28.710 | | |
| 7 | 84.103 | 3.000 | 1.74330 | 49.2 |
| 8 | 46.358 | 0.207 | | |
| 9 | 46.360 | 15.890 | 1.43875 | 94.9 |
| 10 | 366.953 | 15.250 | | |
| 11 | 490.634 | 6.000 | 1.80518 | 25.5 |
| 12 | −106.559 | 2.000 | 1.88300 | 40.8 |
| 13 | 81.365 | 41.750 | | |
| 14(ST) | Infinity | 4.500 | | |
| 15 | −277.940 | 4.100 | 1.84666 | 23.8 |
| 16 | −56.241 | 1.800 | 1.60311 | 60.7 |
| 17 | 148.641 | 3.700 | | |
| 18 | −158.269 | 1.800 | 1.80610 | 33.3 |
| 19 | 123.928 | 3.400 | | |
| 20 | 209.019 | 6.730 | 1.80420 | 46.5 |
| 21 | −39.192 | 1.800 | 1.84666 | 23.8 |
| 22 | −116.747 | 12.750 | | |
| 23 | 253.967 | 5.260 | 1.88100 | 40.1 |
| 24 | −89.594 | 1.110 | | |
| 25 | −84.359 | 1.500 | 1.51742 | 52.2 |
| 26 | 1457.940 | 20.000 | | |
| 27 | Infinity | 1.500 | 1.51680 | 64.2 |
| 28 | Infinity | 33.053 | | |
| S1 | −111.152 | 3.109 | 2.10420 | 17.0 |
| S2 | −44.650 | 4.697 | | |
| S3 | −28.141 | 1.500 | 2.00100 | 29.1 |
| S4 | 29.200 | 4.842 | 1.78472 | 25.7 |
| S5 | 112.802 | 0.100 | | |
| S6 | 62.802 | 10.816 | 1.54814 | 45.8 |
| S7 | −26.420 | 0.100 | | |
| S8 | −35.595 | 1.400 | 2.00178 | 19.3 |
| S9 | −49.975 | 20.285 | | |
| S10 | Infinity | 2.000 | 1.51680 | 64.2 |
| S11 | Infinity | 1.000 | | |

Table 10 below shows aspheric coefficients in the fifth embodiment.

TABLE 10

| Lens surfaces | K | a | b | c |
|---|---|---|---|---|
| S9 | −1.0000 | −2.99490e−006 | −1.29634e−009 | |

Figure 12:
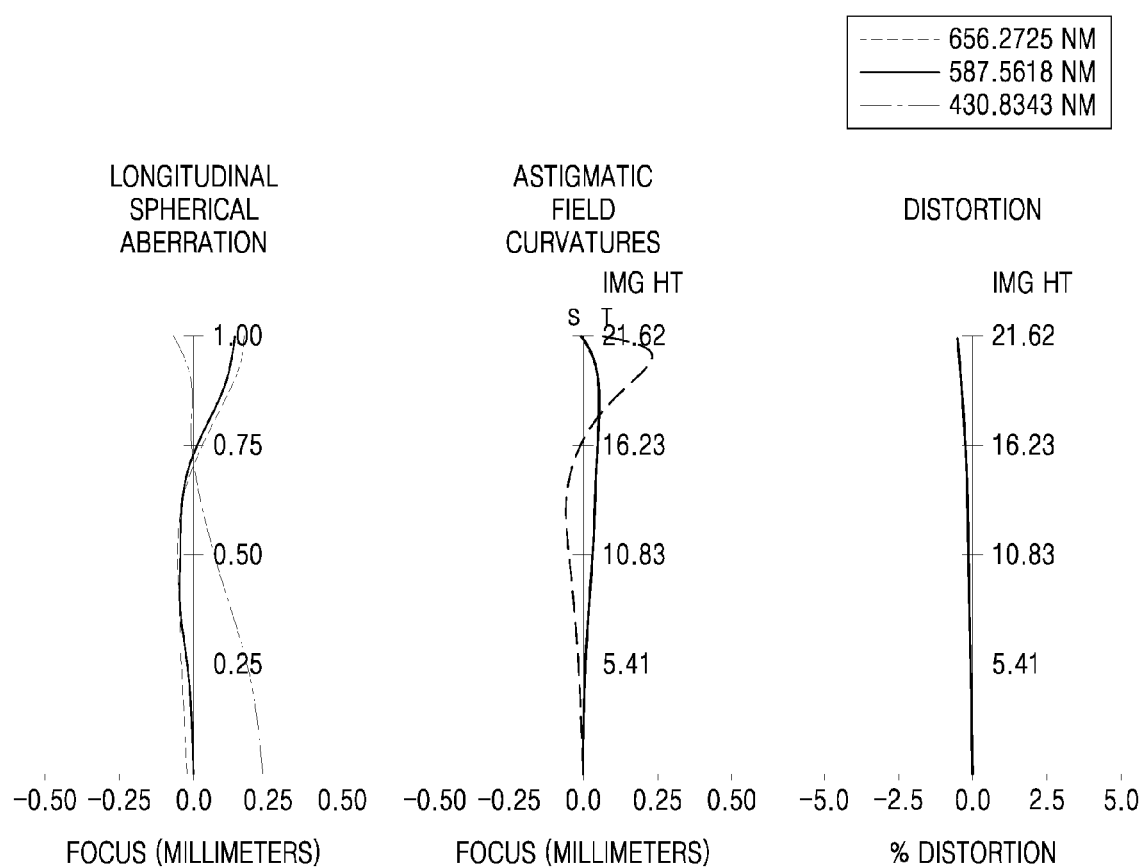
FIG. 12 illustrates aberrations of a lens system in which master lenses ML are combined with the rear conversion lenses of the fifth embodiment.

FIG. 12 illustrates longitudinal spherical aberration, astigmatic field curves, and distortion of a lens system (constituted by the master lenses ML and the rear conversion lenses RL) of the fifth embodiment.

Sixth Embodiment

Figure 13:
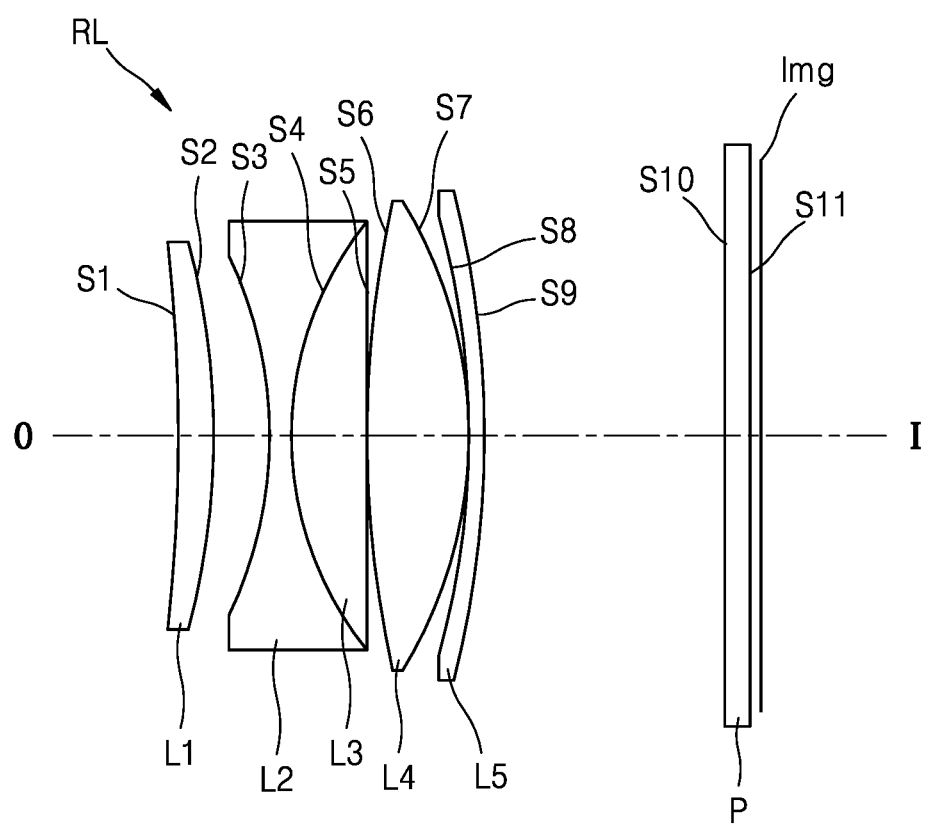
FIG. 13 illustrates rear conversion lenses according to a sixth embodiment.

FIG. 13 illustrates rear conversion lenses RL according to a sixth numeral embodiment, and design data for master lenses ML and the rear conversion lenses RL of the sixth embodiment are shown below.
Table 11 lists values for R, TH, Nd, and Vd, where EFL=408.738, BFL=1.000, FNO=4.03, w=3.04 deg, Magnification=1.4.

TABLE 11

| Lens surfaces | R | TH | Nd | Vd |
|---|---|---|---|---|
| 1 | 207.797 | 10.730 | 1.48749 | 70.4 |
| 2 | −1331.507 | 0.300 | | |
| 3 | 98.708 | 21.000 | 1.43875 | 94.9 |
| 4 | −262.808 | 0.100 | | |
| 5 | −288.092 | 3.500 | 1.78590 | 43.9 |
| 6 | 5388.297 | 28.710 | | |
| 7 | 84.103 | 3.000 | 1.74330 | 49.2 |
| 8 | 46.358 | 0.207 | | |
| 9 | 46.360 | 15.890 | 1.43875 | 94.9 |
| 10 | 366.953 | 15.250 | | |
| 11 | 490.634 | 6.000 | 1.80518 | 25.5 |
| 12 | −106.559 | 2.000 | 1.88300 | 40.8 |

TABLE 11-continued

| Lens surfaces | R | TH | Nd | Vd |
|---|---|---|---|---|
| 13 | 81.365 | 41.750 | | |
| 14(ST) | Infinity | 4.500 | | |
| 15 | −277.940 | 4.100 | 1.84666 | 23.8 |
| 16 | −56.241 | 1.800 | 1.60311 | 60.7 |
| 17 | 148.641 | 3.700 | | |
| 18 | −158.269 | 1.800 | 1.80610 | 33.3 |
| 19 | 123.928 | 3.400 | | |
| 20 | 209.019 | 6.730 | 1.80420 | 46.5 |
| 21 | −39.192 | 1.800 | 1.84666 | 23.8 |
| 22 | −116.747 | 12.750 | | |
| 23 | 253.967 | 5.260 | 1.88100 | 40.1 |
| 24 | −89.594 | 1.110 | | |
| 25 | −84.359 | 1.500 | 1.51742 | 52.2 |
| 26 | 1457.940 | 20.000 | | |
| 27 | Infinity | 1.500 | 1.51680 | 64.2 |
| 28 | Infinity | 33.073 | | |
| S1 | −111.337 | 2.981 | 2.10420 | 17.0 |
| S2 | −47.189 | 4.675 | | |
| S3 | −31.442 | 1.500 | 2.00100 | 29.1 |
| S4 | 24.761 | 6.317 | 1.78470 | 26.3 |
| S5 | 244.995 | 0.100 | | |
| S6 | 71.305 | 8.732 | 1.48749 | 70.4 |
| S7 | −34.150 | 0.100 | | |
| S8 | −52.661 | 1.400 | 1.88202 | 37.2 |
| S9 | −71.304 | 20.249 | | |
| S10 | Infinity | 2.000 | 1.51680 | 64.2 |
| S11 | Infinity | 1.000 | | |

Table 12 below shows aspheric coefficients in the sixth embodiment.

TABLE 12

| Lens surfaces | K | a | b | c |
|---|---|---|---|---|
| S7 | −1.0000 | 2.87992e−006 | 8.89594e−010 | 9.50189e−012 |

Figure 14:
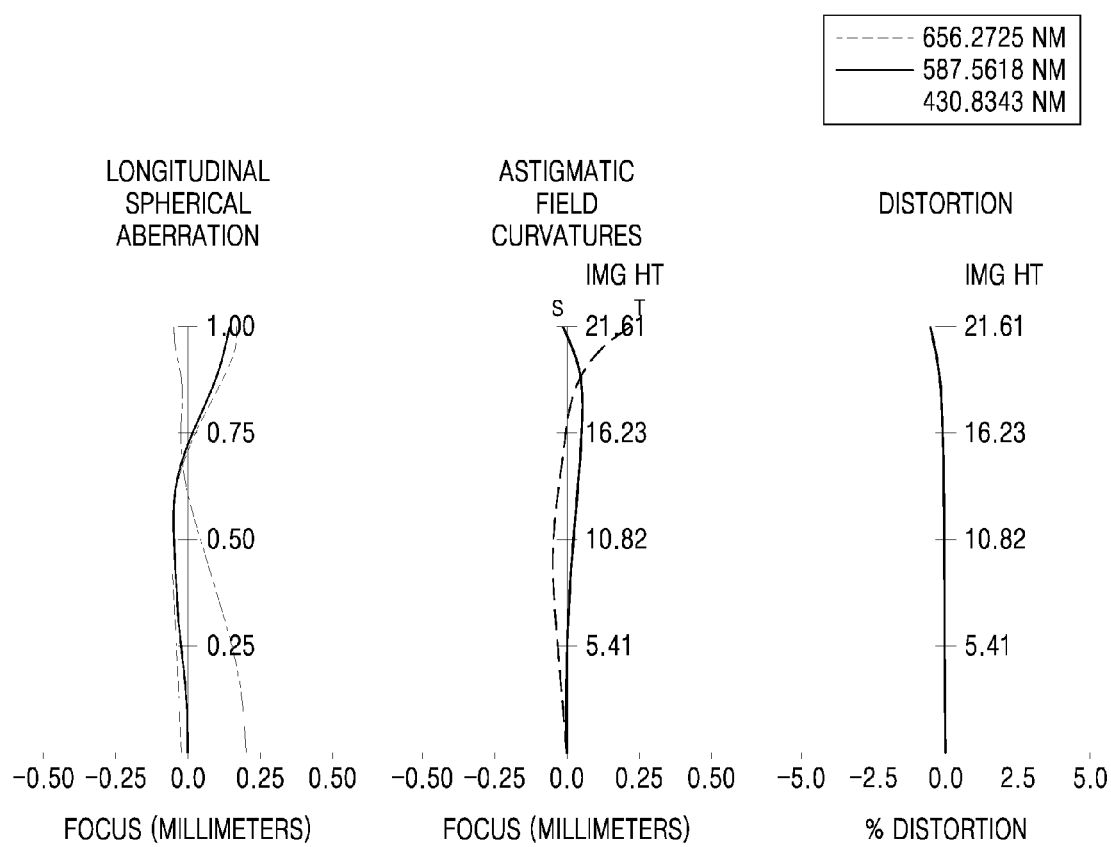
FIG. 14 illustrates aberrations of a lens system in which master lenses ML are combined with the rear conversion lenses of the sixth embodiment.

FIG. 14 illustrates longitudinal spherical aberration, astigmatic field curves, and distortion of a lens system (constituted by the master lenses ML and the rear conversion lenses RL) of the sixth embodiment.

Seventh Embodiment

Figure 15:
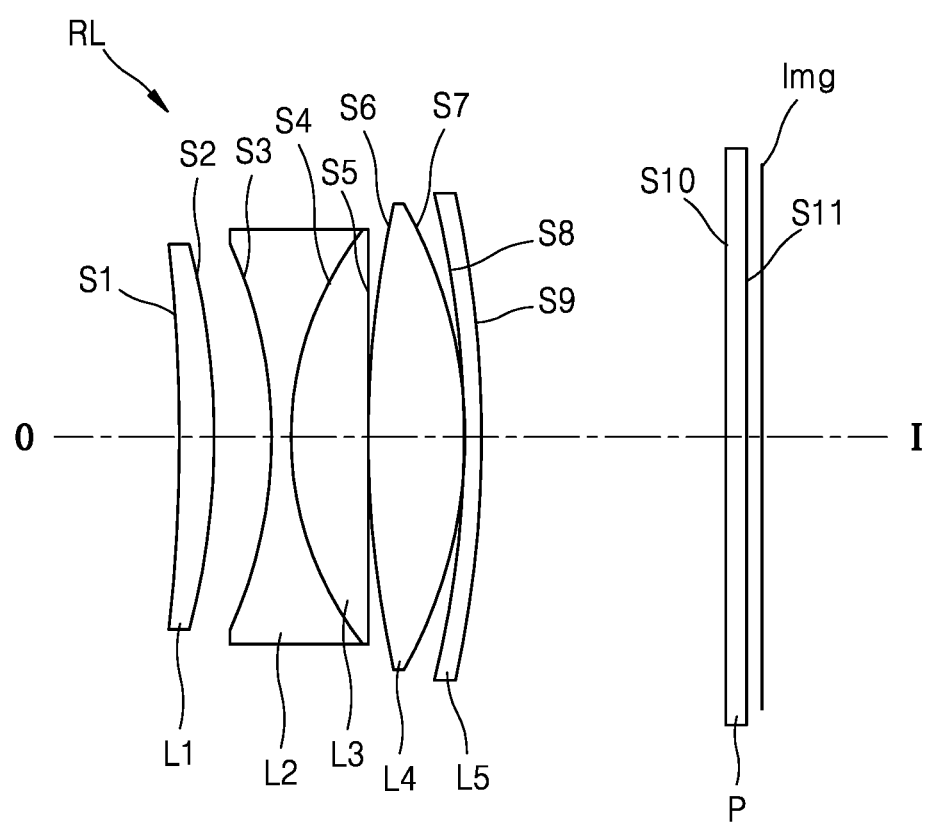
FIG. 15 illustrates rear conversion lenses according to a seventh embodiment.

FIG. 15 illustrates rear conversion lenses RL according to a seventh numeral embodiment, and design data for master lenses ML and the rear conversion lenses RL of the seventh embodiment are shown below.
Table 13 lists values for RDY, THI, Nd, and Vd, where EFL=408.738, BFL=1.000, FNO=4.03, w=3.04 deg, Magnification=1.4

TABLE 13

| Lens surfaces | RDY | THI | Nd | Vd |
|---|---|---|---|---|
| 1 | 207.797 | 10.730 | 1.48749 | 70.4 |
| 2 | −1331.507 | 0.300 | | |
| 3 | 98.708 | 21.000 | 1.43875 | 94.9 |
| 4 | −262.808 | 0.100 | | |
| 5 | −288.092 | 3.500 | 1.78590 | 43.9 |
| 6 | 5388.297 | 28.710 | | |
| 7 | 84.103 | 3.000 | 1.74330 | 49.2 |
| 8 | 46.358 | 0.207 | | |
| 9 | 46.360 | 15.890 | 1.43875 | 94.9 |
| 10 | 366.953 | 15.250 | | |
| 11 | 490.634 | 6.000 | 1.80518 | 25.5 |
| 12 | −106.559 | 2.000 | 1.88300 | 40.8 |

TABLE 13-continued

| Lens surfaces | RDY | THI | Nd | Vd |
|---|---|---|---|---|
| 13 | 81.365 | 41.750 | | |
| 14 | Infinity | 4.500 | | |
| 15 | −277.940 | 4.100 | 1.84666 | 23.8 |
| 16 | −56.241 | 1.800 | 1.60311 | 60.7 |
| 17 | 148.641 | 3.700 | | |
| 18 | −158.269 | 1.800 | 1.80610 | 33.3 |
| 19 | 123.928 | 3.400 | | |
| 20 | 209.019 | 6.730 | 1.80420 | 46.5 |
| 21 | −39.192 | 1.800 | 1.84666 | 23.8 |
| 22 | −116.747 | 12.750 | | |
| 23 | 253.967 | 5.260 | 1.88100 | 40.1 |
| 24 | −89.594 | 1.110 | | |
| 25 | −84.359 | 1.500 | 1.51742 | 52.2 |
| 26 | 1457.940 | 20.000 | | |
| 27 | Infinity | 1.500 | 1.51680 | 64.2 |
| 28 | Infinity | 33.076 | | |
| S1 | −111.470 | 2.963 | 2.10420 | 17.0 |
| S2 | −47.592 | 4.596 | | |
| S3 | −32.277 | 1.500 | 2.00100 | 29.1 |
| S4 | 25.390 | 6.503 | 1.76182 | 26.5 |
| S5 | 1314.241 | 0.100 | | |
| S6 | 81.168 | 8.349 | 1.48749 | 70.4 |
| S7 | −34.193 | 0.100 | | |
| S8 | −64.039 | 1.400 | 1.88202 | 37.2 |
| S9 | −116.896 | 20.243 | | |
| S10 | Infinity | 2.000 | 1.51680 | 64.2 |
| S11 | Infinity | 1.000 | | |

Table 14 below shows aspheric coefficients in the seventh embodiment.

TABLE 14

| Lens surfaces | K | a | b | c |
|---|---|---|---|---|
| S9 | −1.0000 | −3.52898e−006 | −5.90816e−010 | −1.00491e−011 |

Figure 16:
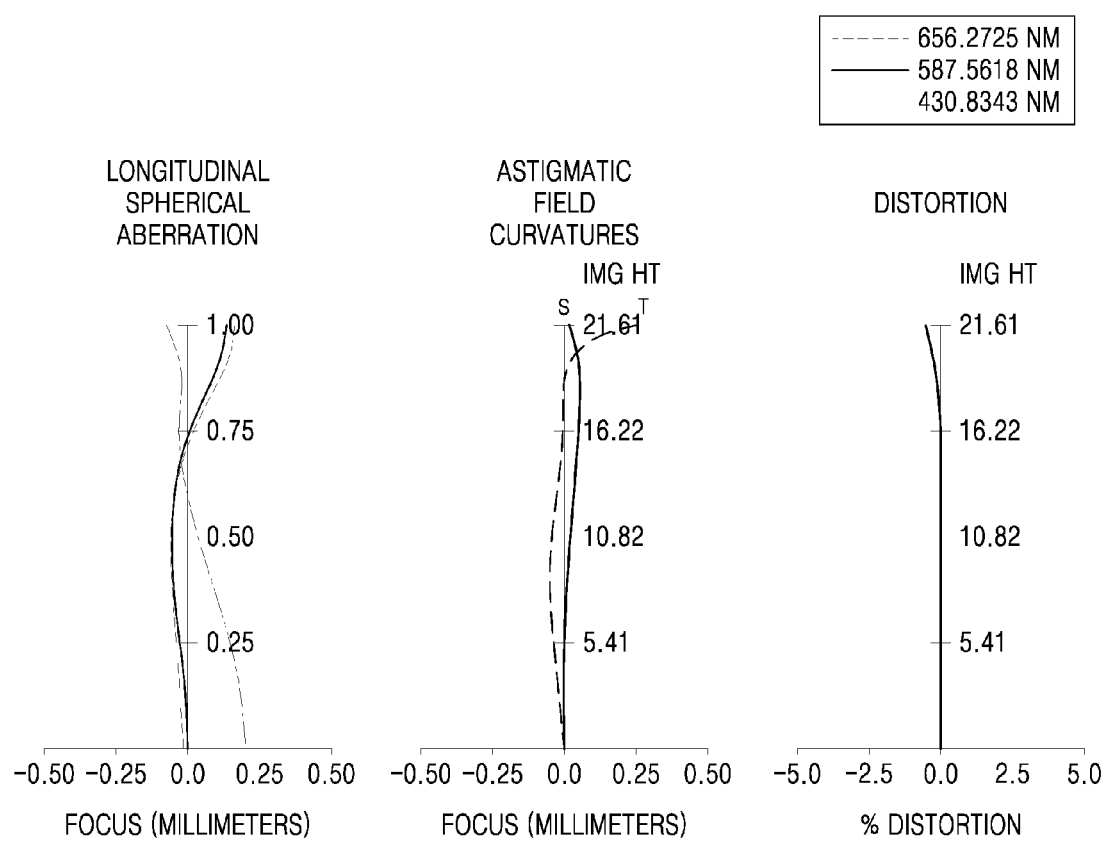
FIG. 16 illustrates aberrations of a lens system in which master lenses ML are combined with the rear conversion lenses of the seventh embodiment.

FIG. 16 illustrates longitudinal spherical aberration, astigmatic field curves, and distortion of a lens system (constituted by the master lenses ML and the rear conversion lenses RL) of the seventh embodiment.

Eighth Embodiment

Figure 17:
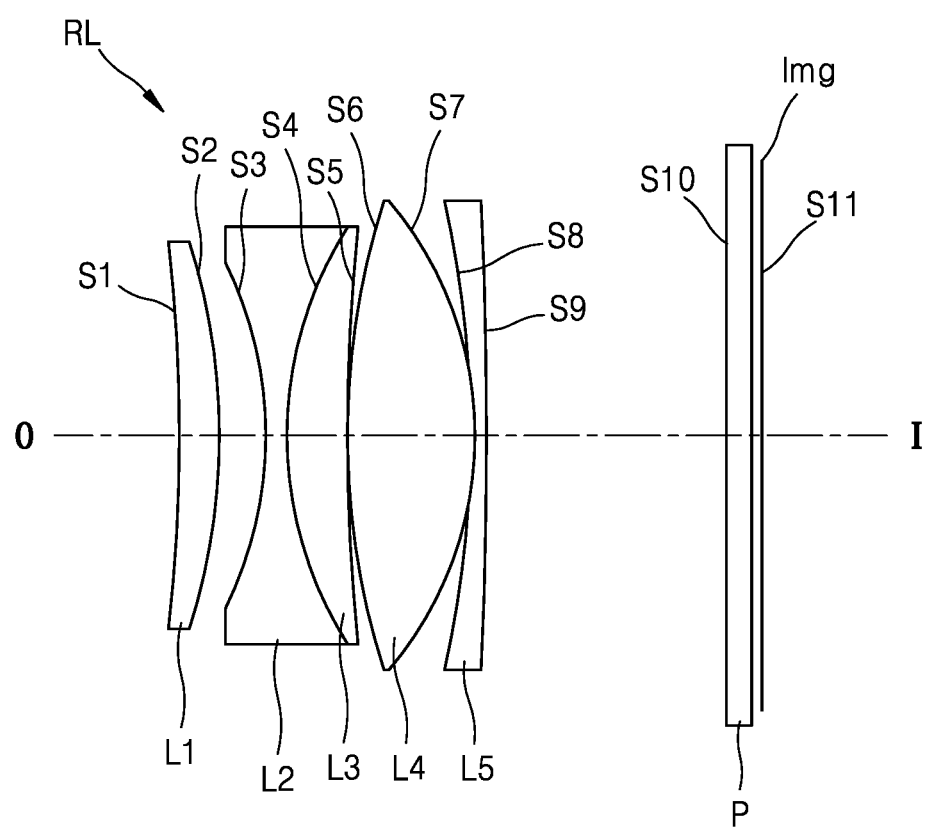
FIG. 17 illustrates rear conversion lenses according to an eighth embodiment.

FIG. 17 illustrates rear conversion lenses RL according to an eighth numeral embodiment, and design data for master lenses ML and the rear conversion lenses RL of the eighth embodiment are shown below.
Table 15 lists RDY, THI, Nd, and Vd values where EFL=408.739, BFL=1.000, FNO=4.03, w=3.00 deg, Magnification=1.4

TABLE 15

| Lens surfaces | RDY | THI | Nd | Vd |
|---|---|---|---|---|
| 1 | 207.797 | 10.730 | 1.48749 | 70.4 |
| 2 | −1331.507 | 0.300 | | |
| 3 | 98.708 | 21.000 | 1.43875 | 94.9 |
| 4 | −262.808 | 0.100 | | |
| 5 | −288.092 | 3.500 | 1.78590 | 43.9 |
| 6 | 5388.297 | 28.710 | | |
| 7 | 84.103 | 3.000 | 1.74330 | 49.2 |
| 8 | 46.358 | 0.207 | | |
| 9 | 46.360 | 15.890 | 1.43875 | 94.9 |
| 10 | 366.953 | 15.250 | | |
| 11 | 490.634 | 6.000 | 1.80518 | 25.5 |
| 12 | −106.559 | 2.000 | 1.88300 | 40.8 |

TABLE 15-continued

| Lens surfaces | RDY | THI | Nd | Vd |
|---|---|---|---|---|
| 13 | 81.365 | 41.750 | | |
| 14(ST) | Infinity | 4.500 | | |
| 15 | −277.940 | 4.100 | 1.84666 | 23.8 |
| 16 | −56.241 | 1.800 | 1.60311 | 60.7 |
| 17 | 148.641 | 3.700 | | |
| 18 | −158.269 | 1.800 | 1.80610 | 33.3 |
| 19 | 123.928 | 3.400 | | |
| 20 | 209.019 | 6.730 | 1.80420 | 46.5 |
| 21 | −39.192 | 1.800 | 1.84666 | 23.8 |
| 22 | −116.747 | 12.750 | | |
| 23 | 253.967 | 5.260 | 1.88100 | 40.1 |
| 24 | −89.594 | 1.110 | | |
| 25 | −84.359 | 1.500 | 1.51742 | 52.2 |
| 26 | 1457.940 | 20.000 | | |
| 27 | Infinity | 1.500 | 1.51680 | 64.2 |
| 28 | Infinity | 33.072 | | |
| S1 | −117.205 | 3.384 | 2.00272 | 19.3 |
| S2 | −40.754 | 3.968 | | |
| S3 | −27.618 | 1.500 | 2.00100 | 29.1 |
| S4 | 28.573 | 5.305 | 1.84666 | 23.8 |
| S5 | 170.255 | 0.100 | | |
| S6 | 61.484 | 10.217 | 1.51742 | 52.2 |
| S7 | −27.786 | 0.100 | | |
| S8 | −77.898 | 1.400 | 2.00100 | 29.1 |
| S9 | −409.055 | 20.246 | | |
| S10 | Infinity | 2.000 | 1.51680 | 64.2 |
| S11 | Infinity | 1.000 | | |

Figure 18:
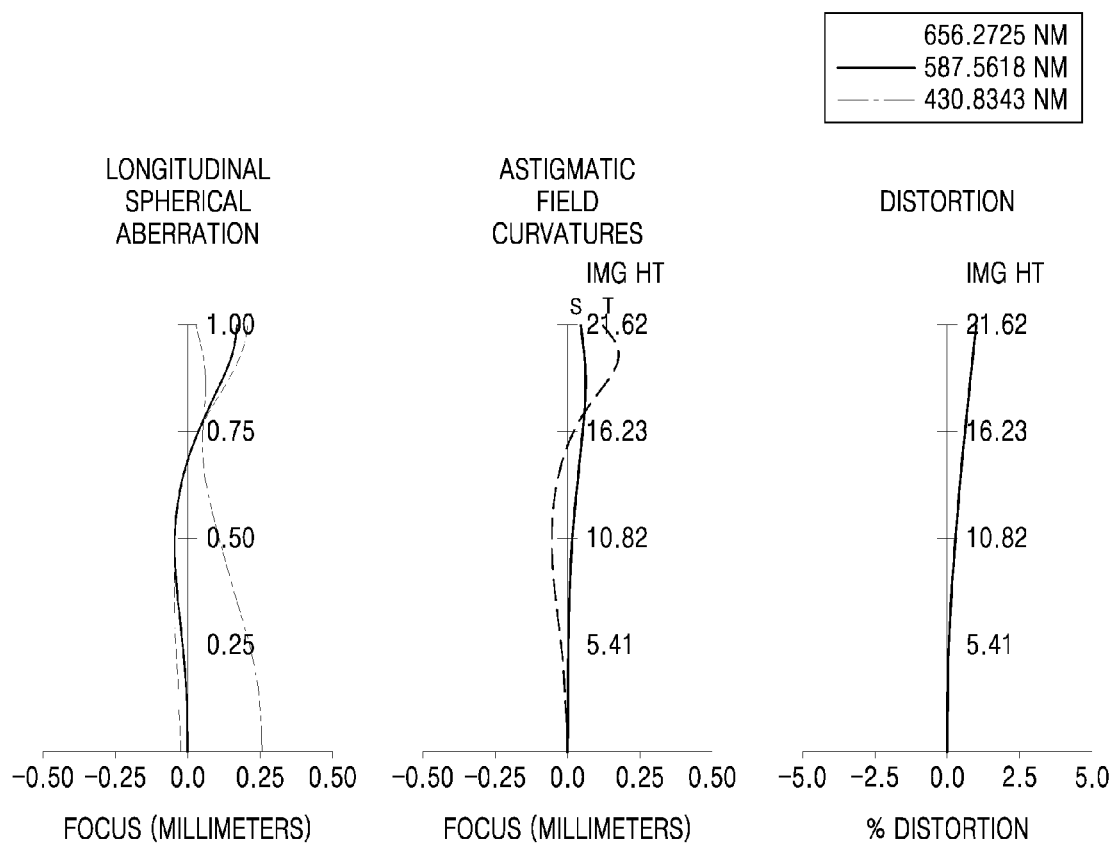
FIG. 18 illustrates aberrations of a lens system in which master lenses ML are combined with the rear conversion lenses of the eighth embodiment.

FIG. 18 illustrates longitudinal spherical aberration, astigmatic field curves, and distortion of a lens system (constituted by the master lenses ML and the rear conversion lenses RL) of the eighth embodiment.

Ninth Embodiment

Figure 19:
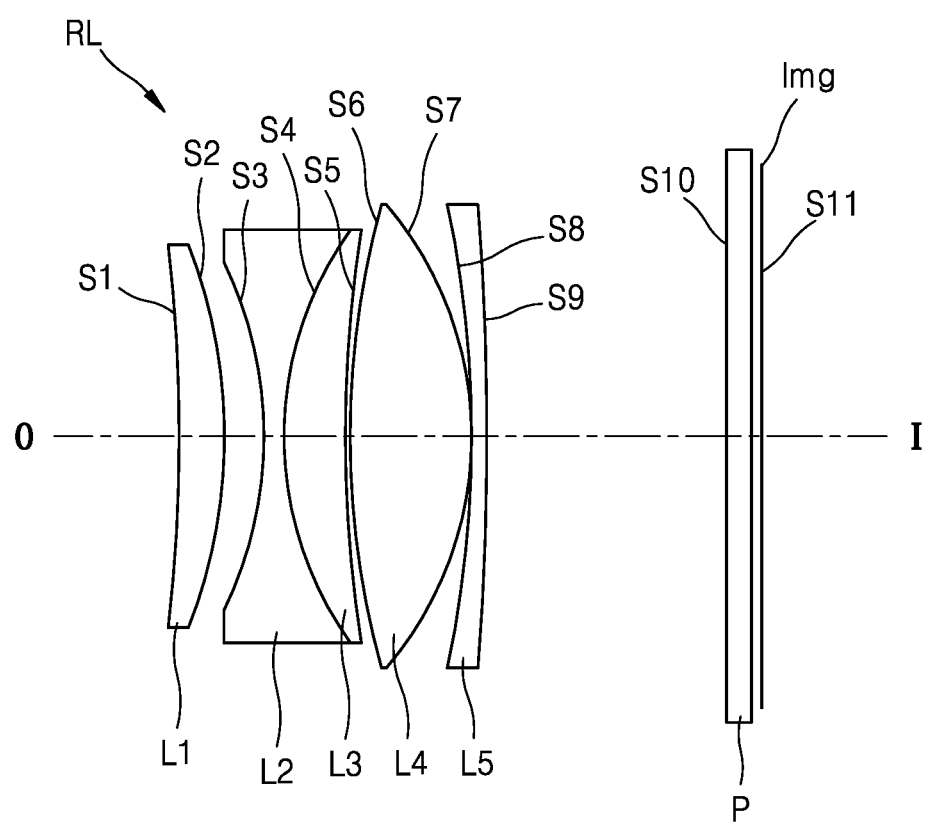
FIG. 19 illustrates rear conversion lenses according to a ninth embodiment.

FIG. 19 illustrates rear conversion lenses RL according to a ninth numeral embodiment, and design data for master lenses ML and the rear conversion lenses RL of the ninth embodiment are shown below.

Table 16 lists RDY, THI, Nd, and Vd values, where EFL=408.737, BFL=1.000, FNO=4.03, w=3.00 deg, Magnification=1.4

TABLE 16

| Lens surfaces | RDY | THI | Nd | Vd |
|---|---|---|---|---|
| 1 | 207.797 | 10.730 | 1.48749 | 70.4 |
| 2 | −1331.507 | 0.300 | | |
| 3 | 98.708 | 21.000 | 1.43875 | 94.9 |
| 4 | −262.808 | 0.100 | | |
| 5 | −288.092 | 3.500 | 1.78590 | 43.9 |

TABLE 16-continued

| Lens surfaces | RDY | THI | Nd | Vd |
|---|---|---|---|---|
| 6 | 5388.297 | 28.710 | | |
| 7 | 84.103 | 3.000 | 1.74330 | 49.2 |
| 8 | 46.358 | 0.207 | | |
| 9 | 46.360 | 15.890 | 1.43875 | 94.9 |
| 10 | 366.953 | 15.250 | | |
| 11 | 490.634 | 6.000 | 1.80518 | 25.5 |
| 12 | −106.559 | 2.000 | 1.88300 | 40.8 |
| 13 | 81.365 | 41.750 | | |
| 14(ST) | Infinity | 4.500 | | |
| 15 | −277.940 | 4.100 | 1.84666 | 23.8 |
| 16 | −56.241 | 1.800 | 1.60311 | 60.7 |
| 17 | 148.641 | 3.700 | | |
| 18 | −158.269 | 1.800 | 1.80610 | 33.3 |
| 19 | 123.928 | 3.400 | | |
| 20 | 209.019 | 6.730 | 1.80420 | 46.5 |
| 21 | −39.192 | 1.800 | 1.84666 | 23.8 |
| 22 | −116.747 | 12.750 | | |
| 23 | 253.967 | 5.260 | 1.88100 | 40.1 |
| 24 | −89.594 | 1.110 | | |
| 25 | −84.359 | 1.500 | 1.51742 | 52.2 |
| 26 | 1457.940 | 20.000 | | |
| 27 | Infinity | 1.500 | 1.51680 | 64.2 |
| 28 | Infinity | 33.047 | | |
| S1 | −121.371 | 3.557 | 1.92286 | 20.9 |
| S2 | −38.661 | 3.832 | | |
| S3 | −26.933 | 1.500 | 2.00100 | 29.1 |
| S4 | 27.853 | 5.208 | 1.92286 | 20.9 |
| S5 | 120.278 | 0.327 | | |
| S6 | 62.137 | 10.392 | 1.48749 | 70.4 |
| S7 | −27.221 | 0.100 | | |
| S8 | −78.846 | 1.400 | 2.00100 | 29.1 |
| S9 | −206.886 | 20.289 | | |
| S10 | Infinity | 2.000 | 1.51680 | 64.2 |
| S11 | Infinity | 1.000 | | |

Figure 20:
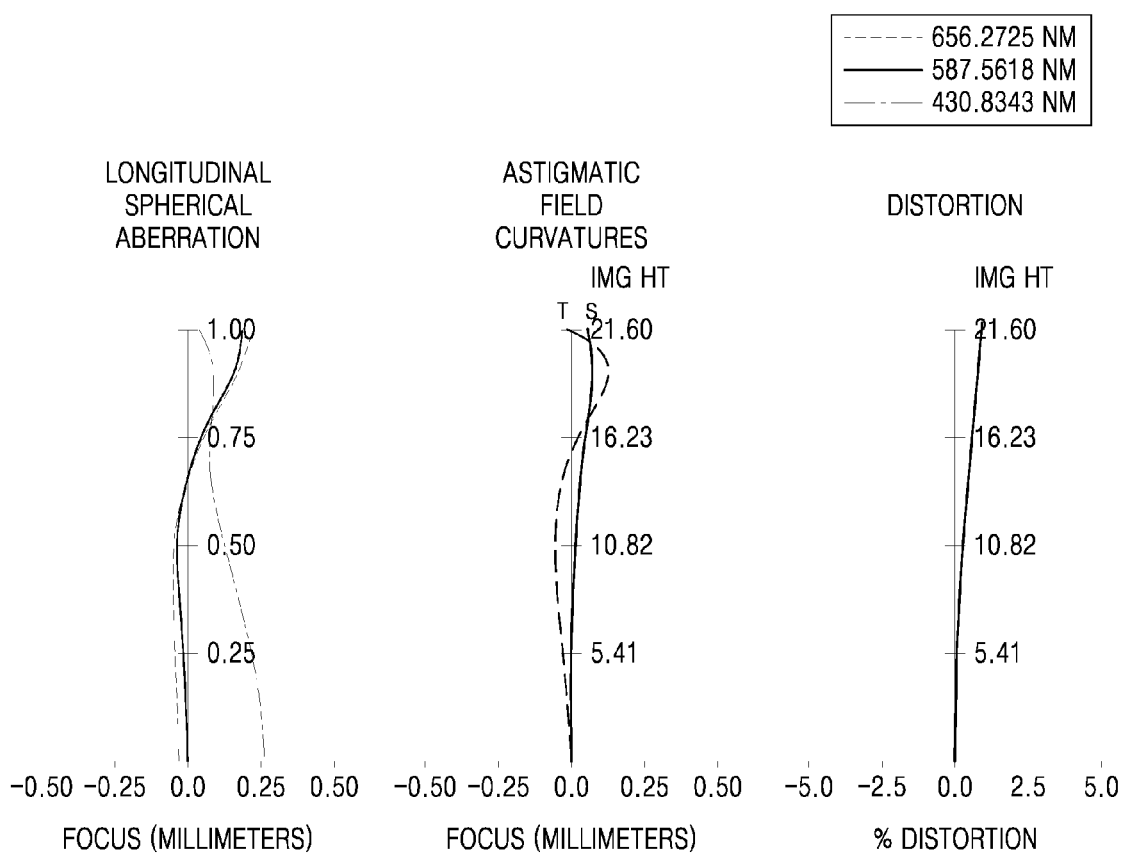
FIG. 20 illustrates aberrations of a lens system in which master lenses ML are combined with the rear conversion lenses of the ninth embodiment.

FIG. 20 illustrates longitudinal spherical aberration, astigmatic field curves, and distortion of a lens system (constituted by the master lenses ML and the rear conversion lenses RL) of the ninth embodiment.

Table 17 (below) shows that the rear conversion lenses RL of the first to ninth embodiments satisfy Expressions 1 to 7.

TABLE 17

| Emodiments | 1 | 2 | 3 | 4 | 5 | 6 | 7 | 8 | 9 |
|---|---|---|---|---|---|---|---|---|---|
| fRC | −89.700 | −108.257 | −78.784 | −136.381 | −123.851 | −109.478 | −102.526 | −99.581 | −107.940 |
| fbRC | 22.558 | 22.562 | 22.542 | 22.607 | 22.604 | 22.568 | 22.562 | 22.564 | 22.608 |
| f1 | 67.274 | 64.847 | 56.948 | 66.089 | 65.967 | 72.408 | 73.426 | 60.958 | 60.231 |
| f2 | −38.081 | −41.472 | −31.992 | −47.281 | −44.999 | −44.603 | −43.321 | −38.160 | −39.590 |
| f2 | 38.081 | −41.472 | −31.992 | −47.281 | −44.999 | −44.603 | −43.321 | −38.160 | −39.590 |
| Y | 21.600 | 21.600 | 21.600 | 21.600 | 21.600 | 21.600 | 21.600 | 21.600 | 21.600 |
| β | 1.400 | 1.400 | 1.400 | 1.400 | 1.400 | 1.400 | 1.400 | 1.400 | 1.400 |
| fbRC/Y | 1.044 | 1.045 | 1.044 | 1.047 | 1.046 | 1.045 | 1.045 | 1.045 | 1.047 |
| f1/\|fRC\| | 0.750 | 0.599 | 0.723 | 0.485 | 0.533 | 0.661 | 0.716 | 0.612 | 0.558 |
| f1/f2 | −1.767 | −1.564 | −1.780 | −1.398 | −1.466 | −1.623 | −1.695 | −1.597 | −1.521 |

Figure 21:
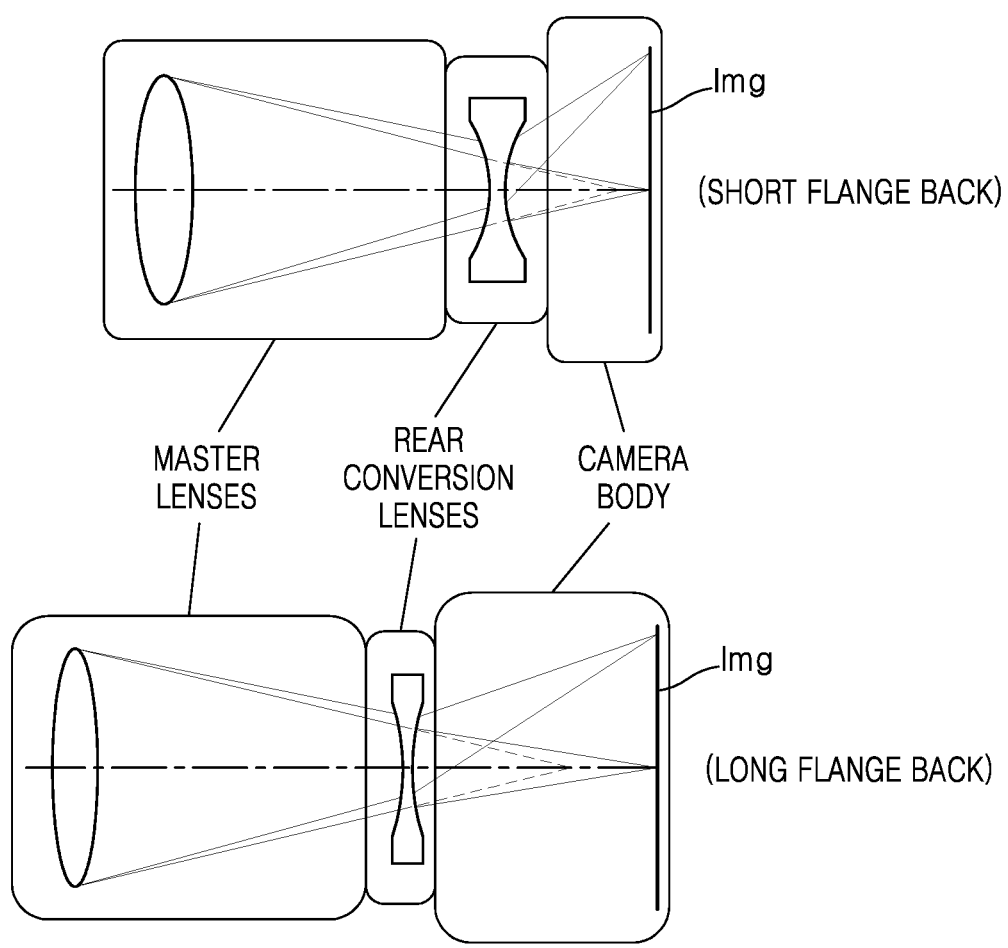
FIG. 21 illustrates a relationship between master lenses and rear conversion lenses.

FIG. 21 illustrates a camera having a relatively short flange back and a camera having a relatively long flange back, each camera including master lenses and rear conversion lenses attached to a camera body. In FIG. 21, lenses are simply illustrated for clarity of description. The refraction angle of rays in the camera having a relatively short flange back is larger than in the camera having a relatively long flange back. Therefore, since the refraction angle of rays is larger in the camera having a relatively short flange back than the camera having a relatively long flange back even though the same image sensor is used, it may be more difficult to design the rear conversion lenses of the camera having a relatively short flange back than to design the rear conversion lenses of the camera having a relatively long flange back. Therefore, this may be considered when adjusting the refractive index of each of the rear conversion lenses of the embodiments.

For example, the rear conversion lenses of the embodiments may be applied to interchangeable lens cameras such as single-lens reflex cameras, and to mirrorless cameras having a short flange back.

It should be understood that the rear conversion lenses described according to embodiments should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A rear conversion lens disposed at a side of a master lens facing an image side for varying a focal length, the rear conversion lens comprising:
   a first lens having a meniscus shape convex toward an image side and a positive refractive power;
   a second lens having a biconcave shape;
   a third lens having a positive refractive power, wherein an absolute value of curvature of a side surface of the third lens facing toward an object side is greater than an absolute value of curvature of an image-side surface of the third lens;
   a fourth lens having a positive refractive power and a biconvex shape; and
   a fifth lens having a negative refractive power,
   wherein the first, second, third, fourth, and fifth lenses are sequentially arranged in a direction from an object side to the image side, and
   wherein the rear conversion lens comprises a first lens group disposed at the object side and a second lens group disposed at the image side with a maximum air gap therebetween, wherein a ratio of a focal length of the first lens group with respect to an absolute value of a focal length of the rear conversion lens is between 0.35 and 0.90.

2. The rear conversion lens of claim 1, wherein the first lens has a refractive index at a d-line that is greater than 1.85.

3. The rear conversion lens of claim 1, wherein the second lens has a refractive index of greater than 1.85 at a d-line.

4. The rear conversion lens of claim 1, wherein the fifth lens has a refractive index of greater than 1.85 at a d-line.

5. The rear conversion lens of claim 1, wherein the fourth lens has a refractive index of greater than 1.65 at a d-line.

6. The rear conversion lens of claim 1, wherein a ratio of a back focal length of the rear conversion lens with respect to a maximum image height is between 0.8 and 1.2.

7. The rear conversion lens of claim 1, wherein the focal length of the first lens group with respect to a focal length of the second lens group is between −2.1 and −1.1.

8. The rear conversion lenses of claim 1, wherein the second lens and the third lens are cemented together as a doublet lens.

9. The rear conversion lenses of claim 1, wherein at least one of the first lens, the fourth lens, and the fifth lens comprises at least one aspheric surface.

10. A rear conversion lens including a plurality of lenses, the rear conversion lens being disposed at a side of one or more master lenses facing an image side for varying a focal length, the rear conversion lens comprising: a first lens having a positive refractive power, a second lens having a negative refractive power, a third lens having a positive refractive power, a fourth lens having a positive refractive power, and a fifth lens having a negative refractive power,
    wherein the first to fifth lenses are sequentially arranged in a direction from an object side to the image side, and
    wherein N1>1.85, N2>1.85, and N5>1.85, wherein N1 denotes a refractive index of the first lens at a d-line, N2 denotes a refractive index of the second lens at the d-line, and N5 denotes a refractive index of the fifth lens at the d-line.

11. The rear conversion lenses of claim 10, wherein N4<1.65,
    wherein N4 denotes a refractive index of the fourth lens at the d-line.

12. The rear conversion lenses of claim 10, wherein 0.8<fbRC/Y<1.2, wherein fbRC denotes a back focal length of the rear conversion lenses at a predetermined magnification and Y denotes a maximum image height.

13. The rear conversion lens of claim 10, wherein the rear conversion lenses are divided into a first lens group disposed at the object side and a second lens group disposed at the image side with a maximum air gap therebetween, and wherein 0.35<f1/|fRC|<0.90, wherein f1 denotes a focal length of the first lens group and fRC denotes a focal length of the rear conversion lenses.

14. The rear conversion lens of claim 13, wherein −2.1<f1/f2<−1.1, wherein f2 denotes a focal length of the second lens group.

15. The rear conversion lens of claim 10, wherein the second lens and the third lens are cemented together as a doublet lens.

16. The rear conversion lens of claim 10, wherein at least one of the first lens, the fourth lens, and the fifth lens comprises at least one aspheric surface.

* * * * *